United States Patent
Ding et al.

(10) Patent No.: US 10,993,198 B2
(45) Date of Patent: Apr. 27, 2021

(54) OUT-OF-SYNCHRONIZATION DETERMINING METHOD AND APPARATUS

(71) Applicant: Huawei Technologies Co., Ltd., Shenzhen (CN)

(72) Inventors: Ding Ding, Xi'an (CN); Boyun Xie, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 16/573,598

(22) Filed: Sep. 17, 2019

(65) Prior Publication Data

US 2020/0015183 A1 Jan. 9, 2020

Related U.S. Application Data

(63) Continuation of application No. PCT/CN2018/079310, filed on Mar. 16, 2018.

(30) Foreign Application Priority Data

Mar. 17, 2017 (CN) .......................... 201710162072.X

(51) Int. Cl.
*H04W 56/00* (2009.01)
*H04B 17/336* (2015.01)
(Continued)

(52) U.S. Cl.
CPC ........ *H04W 56/006* (2013.01); *H04B 17/336* (2015.01); *H04W 24/10* (2013.01); *H04W 56/003* (2013.01); *H04W 72/042* (2013.01)

(58) Field of Classification Search
CPC . H04W 56/006; H04W 24/10; H04W 56/008; H04B 17/336
(Continued)

(56) References Cited

U.S. PATENT DOCUMENTS 8,774,084 B2 * 7/2014 Palanki ............. H04W 56/0015
370/324
2002/0177460 A1 * 11/2002 Beasley ............... H04B 7/2662
455/502
(Continued)

FOREIGN PATENT DOCUMENTS

| CN | 102387515 A | 3/2012 |
|---|---|---|
| CN | 103906097 A | 7/2014 |

(Continued)

OTHER PUBLICATIONS

"3rd Generation Partnership Project; Technical Specification Group Radio Access Network; Evolved Universal Terrestrial Radio Access (E-UTRA); Requirements for support of radio resource management (Release 14)," 3GPP TS 36.133 V14.2.0, pp. 1-2304, 3rd Generation Partnership Project, Valbonne, France (Dec. 2016).

*Primary Examiner* — William Nealon
(74) *Attorney, Agent, or Firm* — Leydig, Voit & Mayer, Ltd.

(57) ABSTRACT

An out-of-synchronization determining method and apparatus are provided. The method includes: receiving, by a control network element, interference metrics sent by N base stations; determining, by the control network element based on the interference metrics, M first to-be-inspected base stations in the N base stations and/or neighboring stations of the N base stations; determining, by the control network element, P second to-be-inspected base stations, where the P second to-be-inspected base stations are base stations meeting a detection condition that are selected from the M first to-be-inspected base stations, and the detection condition is that a characteristic sequence broadcast by the first to-be-inspected base station at a specified position in a radio frame is not received by any neighboring station at the specified position; and determining, by the control network element,
(Continued)

an out-of-synchronization base station in the P second to-be-inspected base stations.

20 Claims, 16 Drawing Sheets

(51) Int. Cl.
*H04W 24/10* (2009.01)
*H04W 72/04* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2008/0232344 | A1* | 9/2008 | Basu ...................... | G01D 21/00 370/350 |
| 2008/0240072 | A1* | 10/2008 | Bykovnikov ......... | H04W 88/08 370/350 |
| 2010/0260169 | A1 | 10/2010 | Gheorghiu et al. | |
| 2014/0177621 | A1 | 6/2014 | Huang et al. | |
| 2016/0007310 | A1 | 1/2016 | Yi et al. | |

FOREIGN PATENT DOCUMENTS

| | | | | |
|---|---|---|---|---|
| EP | 1 041 746 A1 * | 10/2000 | ............... | H04B 7/26 |
| WO | 2010063137 A1 | 6/2010 | | |
| WO | 2011076062 A1 | 6/2011 | | |

* cited by examiner

CONT. FROM FIG. 5A

| | Subframe 0 (D) | | | | | | | | | | | | | | Subframe 1 (S) | | | | | | | | | | | | | |
|---|---|---|---|---|---|---|---|---|---|---|---|---|---|---|---|---|---|---|---|---|---|---|---|---|---|---|---|---|
| Out-of-synchronization base station | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |

| | | Subframe 0 (D) | | | | | | | | | | | | | Subframe 1 (S) | | | | | | | |
|---|---|---|---|---|---|---|---|---|---|---|---|---|---|---|---|---|---|---|---|---|---|---|
| Synchronized base station 1 Symbols with lagging clock | 6 | 0 | 1 | 2 | 3 | 4 | 5 | 6 | 7 | 8 | 9 | 10 | 11 | 12 | 13 | 0 | 1 | 2 | 3 | 4 | 5 | 6 | 7 |
| Synchronized base station 1 Symbols with lagging clock | 6 | 0 | 1 | 2 | 3 | 4 | 5 | 6 | 7 | 8 | 9 | 10 | 11 | 12 | 13 | 0 | 1 | 2 | 3 | 4 | 5 | 6 | 7 |
| Synchronized base station 2 Symbols with lagging clock | 6 | 0 | 1 | 2 | 3 | 4 | 5 | 6 | 7 | 8 | 9 | 10 | 11 | 12 | 13 | 0 | 1 | 2 | 3 | 4 | 5 | 6 | 7 |

CONT. FROM
FIG. 7A

A control network element sends a first notification message to each of M first to-be-inspected base stations, where the first notification message is used to instruct the first to-be-inspected base station to broadcast a characteristic sequence at a preset position in a radio frame ⟶ 801

The control network element sends a second notification message to neighboring stations of the first to-be-inspected base stations, where the second notification message is used to instruct the neighboring station of the first to-be-inspected base station to receive the characteristic sequence at the preset position in the radio frame ⟶ 802

The control network element receives a first response message sent by each neighboring station of the first to-be-inspected base stations, where the first response message is used to indicate whether the neighboring station of the first to-be-inspected base station has received the characteristic sequence ⟶ 803

If determining, based on the first response messages, that no neighboring station of the first to-be-inspected base station has received the characteristic sequence, the control network element determines the first to-be-inspected base station as a second to-be-inspected base station ⟶ 804

FIG. 8

A control network element sends a third notification message to P second to-be-inspected base stations and a fourth notification message to neighboring stations of the second to-be-inspected base stations in turn, where after receiving second response messages sent by neighboring stations of an $i^{th}$ second to-be-inspected base station, the control network element sends the third notification message to an $(i+1)^{th}$ second to-be-inspected base station, and sends the fourth notification message to neighboring stations of the $(i+1)^{th}$ second to-be-inspected base station — 1001

The control network element determines an out-of-synchronization base station based on the second response messages — 1002

FIG. 10

A control network element sends a second detection message to P second to-be-inspected base stations in turn, where after receiving a second feedback message sent by an $i^{th}$ second to-be-inspected base station, the control network element sends the second detection message to an $(i+1)^{th}$ second to-be-inspected base station, where the second detection message is used to instruct the second to-be-inspected base station to stay silent in a preset radio frame, and the second feedback message includes identification information of an out-of-synchronization base station determined by the second to-be-inspected base station — 1101

The control network element determines the out-of-synchronization base station based on the identification information — 1102

FIG. 11

OUT-OF-SYNCHRONIZATION DETERMINING METHOD AND APPARATUS

CROSS-REFERENCE TO RELATED APPLICATIONS

This application is a continuation of International Application No. PCT/CN2018/079310, filed on Mar. 16, 2018, which claims priority to Chinese Patent Application No. 201710162072.X, filed on Mar. 17, 2017. The disclosures of the aforementioned applications are hereby incorporated by reference in their entireties.

TECHNICAL FIELD

Embodiments of this application relate to communications technologies, and in particular, to an out-of-synchronization determining method and an apparatus.

BACKGROUND

A time division duplex (TDD) system is a system with strict clock synchronization. The 3rd generation partnership project (3GPP) TS 36.133 proposes strict technical indicators for synchronization technologies for TDD systems, requiring that cells in a macro cell TDD system be synchronized with an error less than 3 μs. If a clock of a base station is out of synchronization, a downlink symbol of this out-of-synchronization base station is likely to interfere with an uplink symbol of other synchronized base stations, and a downlink symbol of a synchronized base station is also likely to interfere with an uplink symbol of the out-of-synchronization base station. This leads to serious uplink co-channel interference, and consequently network terminals are unable to gain network access, or are poorly served, for example, apt to call drop, handover failure, or service failure, directly affecting experience of network users.

In the prior art, if a clock reference source of a base station is lost, usually, a corresponding alarm is given, and the base station performs a corresponding resynchronization or reset operation. In addition, after the clock reference source is lost for a time that exceeds a preset time period, the base station automatically blocks its carrier-sectors to prevent the base station from causing interference to other neighboring co-channel cells.

However, if a clock reference source is normal, but a clock of a base station is out of synchronization due to a software defect or a back-end device failure, such out-of-synchronization base stations cannot be discovered. As a result, determining of out-of-synchronization base stations is subject to a relatively large error.

SUMMARY

Embodiments of this application provide an out-of-synchronization determining method and apparatus, to resolve the problem of a relatively large error in determining base stations whose clock is out of synchronization.

According to a first aspect, an embodiment of this application provides an out-of-synchronization determining method, including:

receiving, by a control network element, interference metrics sent by N base stations, where the interference metrics include first interference and noise, second interference and noise, and third interference and noise, and the first interference and noise, the second interference and noise, and the third interference and noise are interference received in different uplink subframe symbols;

determining, by the control network element based on the interference metrics, M first to-be-inspected base stations in the N base stations and/or neighboring stations of the N base stations;

determining, by the control network element, P second to-be-inspected base stations, where the P second to-be-inspected base stations are base stations meeting a detection condition that are selected from the M first to-be-inspected base stations, and the detection condition is that a characteristic sequence broadcast by the first to-be-inspected base station at a specified position in a radio frame is not received by any neighboring station at the specified position; and determining, by the control network element, an out-of-synchronization base station in the P second to-be-inspected base stations; where N and M are positive integers, P is an integer, and P is less than or equal to M.

In the out-of-synchronization determining method provided in the first aspect, the interference metrics sent by the N base stations are received, the M first to-be-inspected base stations are determined in the N base stations and/or the neighboring stations of the N base stations based on the interference metrics, and the P second to-be-inspected base stations are determined, where the P second to-be-inspected base stations are base stations meeting the detection condition that are selected from the M first to-be-inspected base stations, and the detection condition is that the characteristic sequence broadcast by the first to-be-inspected base station at the specified position in a radio frame is not received by any neighboring station at the specified position. Then the out-of-synchronization base station is determined in the P second to-be-inspected base stations. The control network element first selects the M first to-be-inspected base stations based on the interference metrics reported by the base stations, then selects the second to-be-inspected base stations meeting the detection condition depending on whether the characteristic sequence broadcast by the first to-be-inspected base station at the specified position in the radio frame can be received by the neighboring stations at the specified position, and finally determines the out-of-synchronization base station. Therefore, a range for determining an out-of-synchronization base station is narrowed down step by step in different approaches, thereby improving accuracy in determining out-of-synchronization base stations.

In a possible design, the determining, by the control network element, P second to-be-inspected base stations includes:

sending, by the control network element, a first notification message to each of the M first to-be-inspected base stations, where the first notification message is used to instruct the first to-be-inspected base station to broadcast the characteristic sequence at the preset position in a radio frame;

sending, by the control network element, a second notification message to neighboring stations of the first to-be-inspected base stations, where the second notification message is used to instruct the neighboring station of the first to-be-inspected base station to receive the characteristic sequence at the preset position in a radio frame;

receiving, by the control network element, a first response message sent by each neighboring station of the first to-be-inspected base stations, where the first response message is used to indicate whether the neighboring station of the first to-be-inspected base station has received the characteristic sequence; and if determining, based on the first response messages, that no neighboring station of the first to-be-inspected base station has received the characteristic sequence, determining, by the control network element, the first to-be-inspected base station as the second to-be-inspected base station.

In this possible design, each of the first to-be-inspected base stations sends the characteristic sequence at the preset position in a different radio frame, and the control network element determines whether all neighboring stations of each first to-be-inspected base station have received the characteristic sequence at the preset position in the corresponding radio frame. If a clock of a first to-be-inspected base station is out of synchronization, neighboring stations of the first to-be-inspected base station are possibly not able to detect the characteristic sequence because of missing a reception detection window. Therefore, the second to-be-inspected base stations that are possibly out of synchronization can be determined, which makes determining of second to-be-inspected base stations more accurate.

In a possible design, the determining, by the control network element, P second to-be-inspected base stations includes:

sending, by the control network element, a first detection message to each of the M first to-be-inspected base stations, where the first detection message is used to instruct the first to-be-inspected base station to send the characteristic sequence at the preset position in a radio frame;

receiving, by the control network element, a first feedback message sent by each of the M first to-be-inspected base stations, where the first feedback message includes identification information of each second to-be-inspected base station determined by the first to-be-inspected base station; and determining, by the control network element based on the identification information, the second to-be-inspected base stations.

In this possible design, each of the first to-be-inspected base stations sends the characteristic sequence at the preset position in a different radio frame, determines whether all the neighboring stations have received the characteristic sequence at the preset position in the corresponding radio frame, thereby determining whether the first to-be-inspected base station itself is a second to-be-inspected base station, and sending a determining result to the control network element. In this way, efficiency in determining second to-be-inspected base stations can be improved.

In a possible design, the determining, by the control network element, an out-of-synchronization base station in the P second to-be-inspected base stations includes:

sending, by the control network element, a third notification message to the P second to-be-inspected base stations and a fourth notification message to neighboring stations of the second to-be-inspected base stations in turn, where after receiving second response messages sent by neighboring stations of an $i^{th}$ second to-be-inspected base station, the control network element sends the third notification message to an $(i+1)^{th}$ second to-be-inspected base station, and sends the fourth notification message to neighboring stations of the $(i+1)^{th}$ second to-be-inspected base station, where the third notification message is used to instruct the second to-be-inspected base station to stay silent in a preset radio frame, the fourth notification message is used to instruct the neighboring station to detect interference when the second to-be-inspected base station is silent, and the second response message is used to indicate whether interference received by the neighboring station of the second to-be-inspected base station that is detected by the neighboring base station has changed when the second to-be-inspected base station is silent; and determining, by the control network element, the out-of-synchronization base station based on the second response messages.

In a possible design, the determining, by the control network element, the out-of-synchronization base station based on the second response messages includes:

if determining, based on the second response messages, that the interference detected by the neighboring stations of the second to-be-inspected base station in the preset radio frame has changed when the second to-be-inspected base station is silent in the preset radio frame, determining, by the control network element, the second to-be-inspected base station as the out-of-synchronization base station.

In this possible design, after the second to-be-inspected base stations become silent in downlink in the preset radio frame, their neighboring stations detect interference in the preset radio frame, to determine whether interference received by the neighboring stations has changed when the second to-be-inspected base station is silent. If the control network element determines that interference received by neighboring stations of a second to-be-inspected base station in the preset radio frame has changed, and a changing pattern matches a silence map of the second to-be-inspected base station, the control network element can determine the second to-be-inspected base station as an out-of-synchronization base station. In this way, accuracy in determining out-of-synchronization base stations can be improved.

In a possible design, the determining, by the control network element, an out-of-synchronization base station in the P second to-be-inspected base stations includes:

sending, by the control network element, a second detection message to the P second to-be-inspected base stations in turn, where after receiving a second feedback message sent by an $i^{th}$ second to-be-inspected base station, the determining module sends the second detection message to an $(i+1)^{th}$ second to-be-inspected base station, where the second detection message is used to instruct the second to-be-inspected base station to stay silent in a preset radio frame, and the second feedback message includes identification information of an out-of-synchronization base station determined by the second to-be-inspected base station; and determining, by the control network element, the out-of-synchronization base station based on the identification information.

In this possible design, after the second to-be-inspected base stations become silent in downlink in the preset radio frame, their neighboring stations detect interference in the preset radio frame, to determine whether interference received by the neighboring stations has changed when the second to-be-inspected base station is silent. If a second to-be-inspected base station determines that interference received by its neighboring stations in the preset radio frame has changed, the second to-be-inspected base station can determine the second to-be-inspected base station itself as the out-of-synchronization base station, and sends a determining result to the control network element, so that the control network element lets the out-of-synchronization base station perform a self-healing operation. In this way, efficiency in determining out-of-synchronization base stations can be improved.

In a possible design, the determining, by the control network element based on the interference metrics, M first to-be-inspected base stations in the N base stations includes:

if N is less than a preset threshold, determining, by the control network element, all the N base stations as the first to-be-inspected base stations.

In a possible design, the determining, by the control network element based on the interference metrics, M first to-be-inspected base stations in the N base stations includes:

if N is greater than or equal to a preset threshold, determining, by the control network element, whether the first interference and noise, the second interference and noise, and the third interference and noise of the N base stations are all greater than a preset gate; and if the first interference and noise, the second interference and noise, and the third interference and noise of the N base stations are all greater than the preset gate, determining, by the control network element in descending order of average values of the first interference and noise, the second interference and noise, and the third interference and noise, first M base stations as the first to-be-inspected base stations.

In a possible design, the determining, by the control network element based on the interference metrics, M first to-be-inspected base stations in neighboring stations of the N base stations includes:

if N is greater than or equal to a preset threshold, and the first interference and noise of the N base stations is less than a preset gate, determining, by the control network element, a quantity of neighbor relationships between each neighboring station of the base stations and the N base stations; and determining, by the control network element in descending order of neighbor relationship quantities, first M neighboring stations as the first to-be-inspected base stations, where the neighbor relationships include neighbor relationships between neighboring stations of the base stations and the N base stations.

In a possible design, the determining, by the control network element based on the interference metrics, M first to-be-inspected base stations in the N base stations and neighboring stations of the N base stations includes:

if N is greater than or equal to a preset threshold, determining, by the control network element in descending order of average values of the first interference and noise, the second interference and noise, and the third interference and noise, first L base stations as the first to-be-inspected base stations, and determining, in descending order of neighbor relationship quantities, first P base stations as the first to-be-inspected base stations, where the neighbor relationships include neighbor relationships between neighboring stations of the base stations and the N base stations, L and P are integers, and a sum of L and P is equal to M.

In the out-of-synchronization determining method provided in the foregoing possible designs, the M first to-be-inspected base stations are determined in the N base stations and/or the neighboring base stations of the N base stations, based on a quantity of base stations reporting the interference metrics and magnitudes of the interference metrics. Therefore, the first to-be-inspected base stations can be determined in different approaches in different scenarios, thereby improving flexibility in determining first to-be-inspected base stations.

According to a second aspect, an embodiment of this application provides an out-of-synchronization determining method, including:

receiving, by a first to-be-inspected base station, a detection message sent by a control network element;

determining, by the first to-be-inspected base station in response to the detection message, a second to-be-inspected base station, where the second to-be-inspected base station is a base station meeting a detection condition, and the detection condition is that a characteristic sequence broadcast by the first to-be-inspected base station at a specified position in a radio frame is not received by any neighboring station at the specified position; and sending, by the first to-be-inspected base station, a feedback message to the control network element, where the feedback message includes identification information of the second to-be-inspected base station.

In the out-of-synchronization determining method provided in the second aspect, the first to-be-inspected base station determines the second to-be-inspected base station based on the detection condition, where the detection condition is that the characteristic sequence broadcast by the first to-be-inspected base station at the specified position in the radio frame is not received by any neighboring station at the specified position. In addition, the first to-be-inspected base station feeds back the identification information of the determined second to-be-inspected base station to the control network element. In this way, efficiency in determining second to-be-inspected base stations can be improved.

In a possible design, the determining, by the first to-be-inspected base station in response to the detection message, a second to-be-inspected base station includes:

sending, by the first to-be-inspected base station in response to the detection message, a notification message to all the neighboring stations, where the notification message is used to instruct the neighboring station to receive the characteristic sequence at the preset position in the radio frame;

sending, by the first to-be-inspected base station, the characteristic sequence at the preset position in the radio frame; and receiving, by the first to-be-inspected base station, a response message sent by each of the neighboring stations, and determining the second to-be-inspected base station based on the response messages, where the response message is used to indicate whether the neighboring station has received the characteristic sequence.

In this possible design, the first to-be-inspected base station sends the characteristic sequence at the preset position in the radio frame, and determines whether all neighboring stations of the first to-be-inspected base station have received the characteristic sequence at the preset position in the radio frame. If the clock of the first to-be-inspected base station is out of synchronization, the neighboring stations of the first to-be-inspected base station are possibly not able to detect the characteristic sequence because of missing a reception detection window. Therefore, the second to-be-inspected base stations that are possibly out of synchronization can be determined, which makes determining of second to-be-inspected base stations more accurate.

In a possible design, the determining the second to-be-inspected base station based on the response messages includes:

if determining, based on the response messages, that none of the neighboring stations has received the characteristic sequence, determining, by the first to-be-inspected base station, the first to-be-inspected base station as the second to-be-inspected base station.

According to a third aspect, an embodiment of this application provides an out-of-synchronization determining method, including:

receiving, by a second to-be-inspected base station, a detection message sent by a control network element;

determining, by the second to-be-inspected base station, an out-of-synchronization base station in response to the detection message, where the out-of-synchronization base station is a base station meeting a detection condition, and the detection condition is that interference detected by neighboring stations of the second to-be-inspected base station has changed when the second to-be-inspected base station is silent; and sending, by the second to-be-inspected base station, a feedback message to the control network element, where the feedback message includes identification information of the out-of-synchronization base station.

In the out-of-synchronization determining method provided in the third aspect, the second to-be-inspected base station determines the out-of-synchronization base station based on that interference detected by the neighboring stations of second to-be-inspected base station has changed when the second to-be-inspected base station is silent, and feeds back the identification information of the determined out-of-synchronization base station to the control network element. In this way, efficiency in determining out-of-synchronization base stations can be improved.

In a possible design, the determining, by the second to-be-inspected base station, an out-of-synchronization base station in response to the detection message includes:

sending, by the second to-be-inspected base station, a notification message to all the neighboring stations, where the notification message is used to instruct the neighboring station to detect interference received by the neighboring station when the second to-be-inspected base station is silent;

setting, by the second to-be-inspected base station, the second to-be-inspected base station to be silent in a preset radio frame; and receiving, by the second to-be-inspected base station, a response message sent by each of the neighboring stations, and determining the out-of-synchronization base station based on the response messages, where the response message is used to indicate whether the interference detected by the neighboring station of the second to-be-inspected base station has changed when the second to-be-inspected base station is silent.

In a possible design, the determining the out-of-synchronization base station based on the response messages includes:

if determining, based on the response messages, that the interference detected by the neighboring stations of the second to-be-inspected base station in the preset radio frame has changed when the second to-be-inspected base station is silent in the preset radio frame, determining, by the second to-be-inspected base station, the second to-be-inspected base station as the out-of-synchronization base station.

In this possible design, after the second to-be-inspected base station becomes silent in downlink in the preset radio frame, its neighboring stations detect interference in the preset radio frame, to determine whether interference received by the neighboring stations has changed when the second to-be-inspected base station is silent. If the second to-be-inspected base station determines that the interference received by the neighboring stations of the second to-be-inspected base station in the preset radio frame has changed, and a changing pattern matches a silence map of the second to-be-inspected base station, the second to-be-inspected base station can determine the second to-be-inspected base station itself as the out-of-synchronization base station. In this way, accuracy in determining out-of-synchronization base stations can be improved.

According to a fourth aspect, an embodiment of this application provides an out-of-synchronization determining apparatus, including:

a receiving module, configured to receive interference metrics sent by N base stations, where the interference metrics include first interference and noise, second interference and noise, and third interference and noise, and the first interference and noise, the second interference and noise, and the third interference and noise are interference received in different uplink subframe symbols; and a determining module, configured to determine, based on the interference metrics, M first to-be-inspected base stations in the N base stations and/or neighboring stations of the N base stations; where the determining module is further configured to determine P second to-be-inspected base stations, where the P second to-be-inspected base stations are base stations meeting a detection condition that are selected from the M first to-be-inspected base stations, and the detection condition is that a characteristic sequence broadcast by the first to-be-inspected base station at a specified position in a radio frame is not received by any neighboring station at the specified position; and the determining module is further configured to determine an out-of-synchronization base station in the P second to-be-inspected base stations; where N and M are positive integers, P is an integer, and P is less than or equal to M.

In a possible design, the determining module is configured to:

send a first notification message to each of the M first to-be-inspected base stations, where the first notification message is used to instruct the first to-be-inspected base station to broadcast the characteristic sequence at the preset position in a radio frame;

send a second notification message to neighboring stations of the first to-be-inspected base stations, where the second notification message is used to instruct the neighboring station of the first to-be-inspected base station to receive the characteristic sequence at the preset position in a radio frame;

receive a first response message sent by each neighboring station of the first to-be-inspected base stations, where the first response message is used to indicate whether the neighboring station of the first to-be-inspected base station has received the characteristic sequence; and if determining, based on the first response messages, that no neighboring station of the first to-be-inspected base station has received the characteristic sequence, determine the first to-be-inspected base station as the second to-be-inspected base station.

In a possible design, the determining module is configured to:

send a first detection message to each of the M first to-be-inspected base stations, where the first detection message is used to instruct the first to-be-inspected base station to send the characteristic sequence at the preset position in a radio frame;

receive a first feedback message sent by each of the M first to-be-inspected base stations, where the first feedback message includes identification information of each second to-be-inspected base station determined by the first to-be-inspected base station; and determine the second to-be-inspected base stations based on the identification information.

In a possible design, the determining module is configured to:

send, a third notification message to the P second to-be-inspected base stations and a fourth notification message to neighboring stations of the second to-be-inspected base stations in turn, where after receiving second response messages sent by neighboring stations of an $i^{th}$ second to-be-inspected base station, the control network element sends the third notification message to an $(i+1)^{th}$ second to-be-inspected base station, and sends the fourth notification message to neighboring stations of the $(i+1)^{th}$ second to-be-inspected base station, where the third notification message is used to instruct the second to-be-inspected base station to stay silent in a preset radio frame, the fourth notification message is used to instruct the neighboring station to detect interference when the second to-be-inspected base station is silent, and the second response message is used to indicate whether interference received by the neighboring station of the second to-be-inspected base station that is detected by the neighboring base station has changed when the second to-be-inspected base station is silent; and determine the out-of-synchronization base station based on the second response messages.

In a possible design, the determining module is further configured to, if determining, based on the second response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

In a possible design, the determining module is configured to:

send a second detection message to the P second to-be-inspected base stations in turn, where after receiving a second feedback message sent by an $i^{th}$ second to-be-inspected base station, the determining module sends the second detection message to an $(i+1)^{th}$ second to-be-inspected base station, where the second detection message is used to instruct the second to-be-inspected base station to stay silent in a preset radio frame, and the second feedback message includes identification information of an out-of-synchronization base station determined by the second to-be-inspected base station; and determine the out-of-synchronization base station based on the identification information.

In a possible design, the determining module is configured to:

if N is less than a preset threshold, determine all the N base stations as the first to-be-inspected base stations.

In a possible design, the determining module is configured to:

if N is greater than or equal to a preset threshold, determine whether the first interference and noise, the second interference and noise, and the third interference and noise of the N base stations are all greater than a preset gate; and if the first interference and noise, the second interference and noise, and the third interference and noise of the N base stations are all greater than the preset gate, determine, in descending order of average values of the first interference and noise, the second interference and noise, and the third interference and noise, first M base stations as the first to-be-inspected base stations.

In a possible design, the determining module is configured to:

if N is greater than or equal to a preset threshold, and the first interference and noise of the N base stations is less than a preset gate, determine a quantity of neighbor relationships between each neighboring station of the base stations and the N base stations; and determine, in descending order of neighbor relationship quantities, first M neighboring stations as the first to-be-inspected base stations, where the neighbor relationships include neighbor relationships between neighboring stations of the base stations and the N base stations.

In a possible design, the determining module is configured to:

if N is greater than or equal to a preset threshold, determine, in descending order of average values of the first interference and noise, the second interference and noise, and the third interference and noise, first L base stations as the first to-be-inspected base stations, and determine, in descending order of neighbor relationship quantities, first P base stations as the first to-be-inspected base stations, where the neighbor relationships include neighbor relationships between neighboring stations of the base stations and the N base stations, L and P are integers, and a sum of L and P is equal to M.

For beneficial effects of the out-of-synchronization determining apparatus provided in the fourth aspect and the possible designs of the fourth aspect, refer to the beneficial effects brought by the first aspect and the possible designs of the first aspect. No more details are described herein.

According to a fifth aspect, an embodiment of this application provides an out-of-synchronization determining apparatus, including:

a receiving module, configured to receive a detection message sent by a control network element;

a determining module, configured to determine, in response to the detection message, a second to-be-inspected base station, where the second to-be-inspected base station is a base station meeting a detection condition, and the detection condition is that a characteristic sequence broadcast by a first to-be-inspected base station at a specified position in a radio frame is not received by any neighboring station at the specified position; and a sending module, configured to send a feedback message to the control network element, where the feedback message includes identification information of the second to-be-inspected base station.

In a possible design, the determining module is configured to:

send, in response to the detection message, a notification message to all the neighboring stations, where the notification message is used to instruct the neighboring station to receive the characteristic sequence at the preset position in the radio frame;

send the characteristic sequence at the preset position in the radio frame; and receive a response message sent by each of the neighboring stations, and determine the second to-be-inspected base station based on the response messages, where the response message is used to indicate whether the neighboring station has received the characteristic sequence.

In a possible design, the determining module is configured to:

if determining, based on the response messages, that none of the neighboring stations has received the characteristic sequence, determine the out-of-synchronization determining apparatus as the second to-be-inspected base station.

For beneficial effects of the out-of-synchronization determining apparatus provided in the fifth aspect and the possible designs of the fifth aspect, refer to the beneficial effects brought by the second aspect and the possible designs of the second aspect. No more details are described herein.

According to a sixth aspect, an embodiment of this application provides an out-of-synchronization determining apparatus, including:

a receiving module, configured to receive a detection message sent by a control network element;

a determining module, configured to determine an out-of-synchronization base station in response to the detection message, where the out-of-synchronization base station is a base station meeting a detection condition, and the detection condition is that interference detected by neighboring stations of the out-of-synchronization determining apparatus has changed when the out-of-synchronization determining apparatus is silent; and a sending module, configured to send a feedback message to the control network element, where the feedback message includes identification information of the out-of-synchronization base station.

In a possible design, the determining module is configured to:

send a notification message to all the neighboring stations, where the notification message is used to instruct the neighboring station to detect interference received by the neighboring station when the out-of-synchronization determining apparatus is silent;

set the out-of-synchronization determining apparatus to be silent in a preset radio frame; and receive a response message sent by each of the neighboring stations, and determine the out-of-synchronization base station based on the response messages, where the response message is used to indicate whether the interference detected by the neighboring station of the out-of-synchronization determining apparatus has changed when the out-of-synchronization determining apparatus is silent.

In a possible design, the determining module is configured to:

if determining, based on the response messages, that the interference detected by the neighboring stations of the out-of-synchronization determining apparatus in the preset radio frame has changed when the out-of-synchronization determining apparatus is silent in the preset radio frame, determine the out-of-synchronization determining apparatus as the out-of-synchronization base station.

For beneficial effects of the out-of-synchronization determining apparatus provided in the sixth aspect and the possible designs of the sixth aspect, refer to the beneficial effects brought by the third aspect and the possible designs of the third aspect. No more details are described herein.

According to a seventh aspect, an embodiment of this application provides a control network element, including:

a receiver, configured to receive interference metrics sent by N base stations, where the interference metrics include first interference and noise, second interference and noise, and third interference and noise, and the first interference and noise, the second interference and noise, and the third interference and noise are interference received in different uplink subframe symbols; and a processor, configured to determine, based on the interference metrics, M first to-be-inspected base stations in the N base stations and/or neighboring stations of the N base stations; where the processor is further configured to determine P second to-be-inspected base stations, where the P second to-be-inspected base stations are base stations meeting a detection condition that are selected from the M first to-be-inspected base stations, and the detection condition is that a characteristic sequence broadcast by the first to-be-inspected base station at a specified position in a radio frame is not received by any neighboring station at the specified position; and the processor is further configured to determine an out-of-synchronization base station in the P second to-be-inspected base stations; where N and M are positive integers, P is an integer, and P is less than or equal to M.

In a possible design, the control network element further includes a transmitter, where the transmitter is configured to send a first notification message to each of the M first to-be-inspected base stations, where the first notification message is used to instruct the first to-be-inspected base station to broadcast the characteristic sequence at the preset position in a radio frame;

the transmitter is further configured to send a second notification message to neighboring stations of the first to-be-inspected base stations, where the second notification message is used to instruct the neighboring station of the first to-be-inspected base station to receive the characteristic sequence at the preset position in a radio frame;

the receiver is further configured to receive a first response message sent by each neighboring station of the first to-be-inspected base stations, where the first response message is used to indicate whether the neighboring station of the first to-be-inspected base station has received the characteristic sequence; and the processor is further configured to, if determining, based on the first response messages, that no neighboring station of the first to-be-inspected base station has received the characteristic sequence, determine the first to-be-inspected base station as the second to-be-inspected base station.

In a possible design, the transmitter is further configured to send a first detection message to each of the M first to-be-inspected base stations, where the first detection message is used to instruct the first to-be-inspected base station to send the characteristic sequence at the preset position in a radio frame;

the receiver is further configured to receive a first feedback message sent by each of the M first to-be-inspected base stations, where the first feedback message includes identification information of each second to-be-inspected base station determined by the first to-be-inspected base station; and the processor is further configured to determine the second to-be-inspected base stations based on the identification information.

In a possible design, the transmitter is further configured to send a third notification message to the P second to-be-inspected base stations and a fourth notification message to neighboring stations of the second to-be-inspected base stations in turn, where after receiving second response messages sent by neighboring stations of an $i^{th}$ second to-be-inspected base station, the control network element sends the third notification message to an $(i+1)^{th}$ second to-be-inspected base station, and sends the fourth notification message to neighboring stations of the $(i+1)^{th}$ second to-be-inspected base station, where the third notification message is used to instruct the second to-be-inspected base station to stay silent in a preset radio frame, the fourth notification message is used to instruct the neighboring station to detect interference when the second to-be-inspected base station is silent, and the second response message is used to indicate whether interference received by the neighboring station of the second to-be-inspected base station that is detected by the neighboring base station has changed when the second to-be-inspected base station is silent; and the processor is further configured to determine the out-of-synchronization base station based on the second response messages.

In a possible design, the processor is configured to:

if determining, based on the second response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

In a possible design, the transmitter is configured to send a second detection message to the P second to-be-inspected base stations in turn, where after receiving a second feedback message sent by an $i^{th}$ second to-be-inspected base station, the determining module sends the second detection message to an $(i+1)^{th}$ second to-be-inspected base station, where the second detection message is used to instruct the second to-be-inspected base station to stay silent in a preset radio frame, and the second feedback message includes identification information of an out-of-synchronization base station determined by the second to-be-inspected base station; and the processor is further configured to determine the out-of-synchronization base station based on the identification information.

In a possible design, the processor is configured to:

if N is less than a preset threshold, determine all the N base stations as the first to-be-inspected base stations.

In a possible design, the processor is configured to:

if N is greater than or equal to a preset threshold, determine whether the first interference and noise, the second interference and noise, and the third interference and noise of the N base stations are all greater than a preset gate; and if the first interference and noise, the second interference and noise, and the third interference and noise of the N base stations are all greater than the preset gate, determine, in descending order of average values of the first interference and noise, the second interference and noise, and the third interference and noise, first M base stations as the first to-be-inspected base stations.

In a possible design, the processor is configured to:

if N is greater than or equal to a preset threshold, and the first interference and noise of the N base stations is less than a preset gate, determine a quantity of neighbor relationships between each neighboring station of the base stations and the N base stations; and determine, in descending order of neighbor relationship quantities, first M neighboring stations as the first to-be-inspected base stations, where the neighbor relationships include neighbor relationships between neighboring stations of the base stations and the N base stations.

In a possible design, the processor is configured to:

if N is greater than or equal to a preset threshold, determine, in descending order of average values of the first interference and noise, the second interference and noise, and the third interference and noise, first L base stations as the first to-be-inspected base stations, and determine, in descending order of neighbor relationship quantities, first P base stations as the first to-be-inspected base stations, where the neighbor relationships include neighbor relationships between neighboring stations of the base stations and the N base stations, L and P are integers, and a sum of L and P is equal to M.

For beneficial effects of the control network element provided in the seventh aspect and the possible designs of the seventh aspect, refer to the beneficial effects brought by the first aspect and the possible designs of the first aspect. No more details are described herein.

According to an eighth aspect, an embodiment of this application provides a base station, including:

a receiver, configured to receive a detection message sent by a control network element;

a processor, configured to determine, in response to the detection message, a second to-be-inspected base station, where the second to-be-inspected base station is a base station meeting a detection condition, and the detection condition is that a characteristic sequence broadcast by the first to-be-inspected base station at a specified position in a radio frame is not received by any neighboring station at the specified position; and a transmitter, configured to send a feedback message to the control network element, where the feedback message includes identification information of the second to-be-inspected base station.

In a possible design, the transmitter is further configured to send, in response to the detection message, a notification message to all the neighboring stations, where the notification message is used to instruct the neighboring station to receive the characteristic sequence at the preset position in the radio frame;

the transmitter is further configured to send the characteristic sequence at the preset position in the radio frame; and the receiver is further configured to receive a response message sent by each of the neighboring stations, and determine the second to-be-inspected base station based on the response messages, where the response message is used to indicate whether the neighboring station has received the characteristic sequence.

In a possible design, the processor is configured to:

if determining, based on the response messages, that none of the neighboring stations has received the characteristic sequence, determine, by the first to-be-inspected base station, the first to-be-inspected base station as the second to-be-inspected base station.

For beneficial effects of the base station provided in the eighth aspect and the possible designs of the eighth aspect, refer to the beneficial effects brought by the second aspect and the possible designs of the second aspect. No more details are described herein.

According to a ninth aspect, an embodiment of this application provides a base station, including:

a receiver, configured to receive a detection message sent by a control network element;

a processor, configured to determine an out-of-synchronization base station in response to the detection message, where the out-of-synchronization base station is a base station meeting a detection condition, and the detection condition is that interference detected by neighboring stations of the second to-be-inspected base station has changed when the second to-be-inspected base station is silent; and a transmitter, configured to send a feedback message to the control network element, where the feedback message includes identification information of the out-of-synchronization base station.

In a possible design, the transmitter is configured to send a notification message to all the neighboring stations, where the notification message is used to instruct the neighboring station to detect interference received by the neighboring station when the second to-be-inspected base station is silent;

the processor is configured to set the second to-be-inspected base station to be silent in a preset radio frame; and the receiver is configured to receive a response message sent by each of the neighboring stations, and determine the out-of-synchronization base station based on the response messages, where the response message is used to indicate whether the interference detected by the neighboring stations of the second to-be-inspected base station has changed when the second to-be-inspected base station is silent.

In a possible design, the processor is configured to:

if determining, based on the response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

For beneficial effects of the base station provided in the ninth aspect and the possible designs of the ninth aspect, refer to the beneficial effects brought by the third aspect and the possible designs of the third aspect. No more details are described herein.

According to a tenth aspect, this application provides a computer-readable storage medium. The computer-readable storage medium stores an instruction, and when the instruction runs on a computer, the computer is enabled to perform the methods described in the foregoing aspects.

BRIEF DESCRIPTION OF DRAWINGS

FIG. 6A and FIG. 6B are a schematic diagram of a base station reporting interference metrics;

FIG. 7A and FIG. 7B are a schematic diagram of a base station reporting interference metrics;

FIG. 8 is a schematic flowchart of determining a second to-be-inspected base station by a control network element according to an embodiment of this application;

FIG. 10 is a schematic flowchart of determining an out-of-synchronization base station in P second to-be-inspected base stations by a control network element according to an embodiment of this application;

FIG. 11 is a schematic flowchart of determining an out-of-synchronization base station by a control network element according to an embodiment of this application;

DESCRIPTION OF EMBODIMENTS

The following describes some terms used in the embodiments of this application to help understanding of a person skilled in the art.

A base station, also referred to as a radio access network (RAN) device, is a device that connects a terminal to a radio network. The base station may be a base transceiver station (BTS) in global system for mobile communications (GSM) or code division multiple access (CDMA for short), or may be a NodeB (NB) in wideband code division multiple access (WCDMA), or may be an evolved NodeB (eNB or eNodeB) in long term evolution (Long Term Evolution), a relay station or an access point, a base station in a future 5G network, or the like. This is not limited herein.

A control network element, namely, a central determining control network element, is a logical network element that may be deployed alone or integrated with a network manager or a base station. In the embodiments of this application, the control network element is integrated with a network manager. The network manager is an integrated network device management system, used for unified management of other devices in a network. The network manager may be, for example, a Huawei iManager U2000. In this application, the control network element is integrated in a network manager, and is configured to determine an out-of-synchronization base station based on interference metrics reported by various base stations, when a base station is out of synchronization and interferes with other base stations. The control network element may also have other functions. This is not limited in this application.

Figure 1:
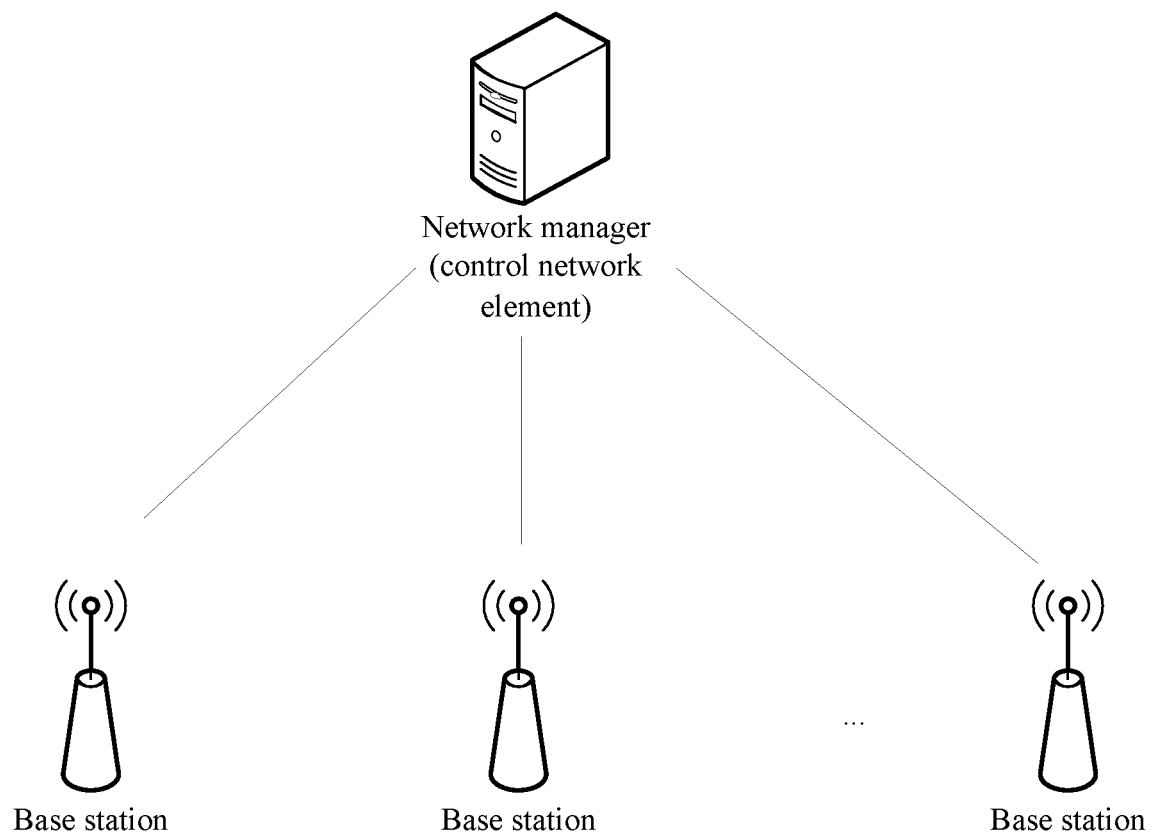
FIG. 1 is a schematic diagram of a network architecture according to an embodiment of this application.

FIG. 1 is a schematic diagram of a network architecture according to an embodiment of this application. As shown in FIG. 1, the network architecture includes a control network element and a plurality of base stations. The control network element is integrated in a network manager. There are two types of interfaces between the control network element and the base stations. One type is binary message interfaces, which are used for interference reporting by the base stations, delivering by the control network element detection messages and silence-based detection messages to the base stations, and reporting sequence detection results and silence-based detection results by the base stations to the control network element. The other type is man-machine language (MML) command interfaces. The control network element can deliver messages through this type of interface, to, for example, query about neighboring stations of a base station.

An out-of-synchronization determining method provided in the embodiments of this application is applicable to scenarios of co-channel continuous coverage. In such scenario, a clock of one base station being out of synchronization causes surrounding synchronized base stations or this out-of-synchronization base station to be interfered with. In a common out-of-synchronization determining method, if a clock reference source of a base station is lost, usually, a corresponding alarm is given, so that the out-of-synchronization base station is determined as indicated in the alarm. In addition, the out-of-synchronization base station performs a corresponding resynchronization or reset operation. After the clock reference source is lost for a time that exceeds a preset time period, the base station automatically blocks its carrier-sectors to prevent the base station from causing interference to other neighboring co-channel cells. However, if a clock reference source is normal, but a clock of a base station is out of synchronization due to a software defect or a back-end device failure, alarming is not possible, and such out-of-synchronization base stations cannot be discovered. As a result, determining of out-of-synchronization base stations is subject to relatively poor accuracy.

Therefore, this application provides an out-of-synchronization determining method and apparatus, to resolve the technical problem of a relatively large error and relatively poor accuracy in determining out-of-synchronization base stations in the prior art.

The following describes the technical solutions of this application in detail by using specific embodiments. For the following several specific embodiments, mutual reference may be made, and same or similar concepts or processes may be omitted in some of the embodiments.

Figure 2:
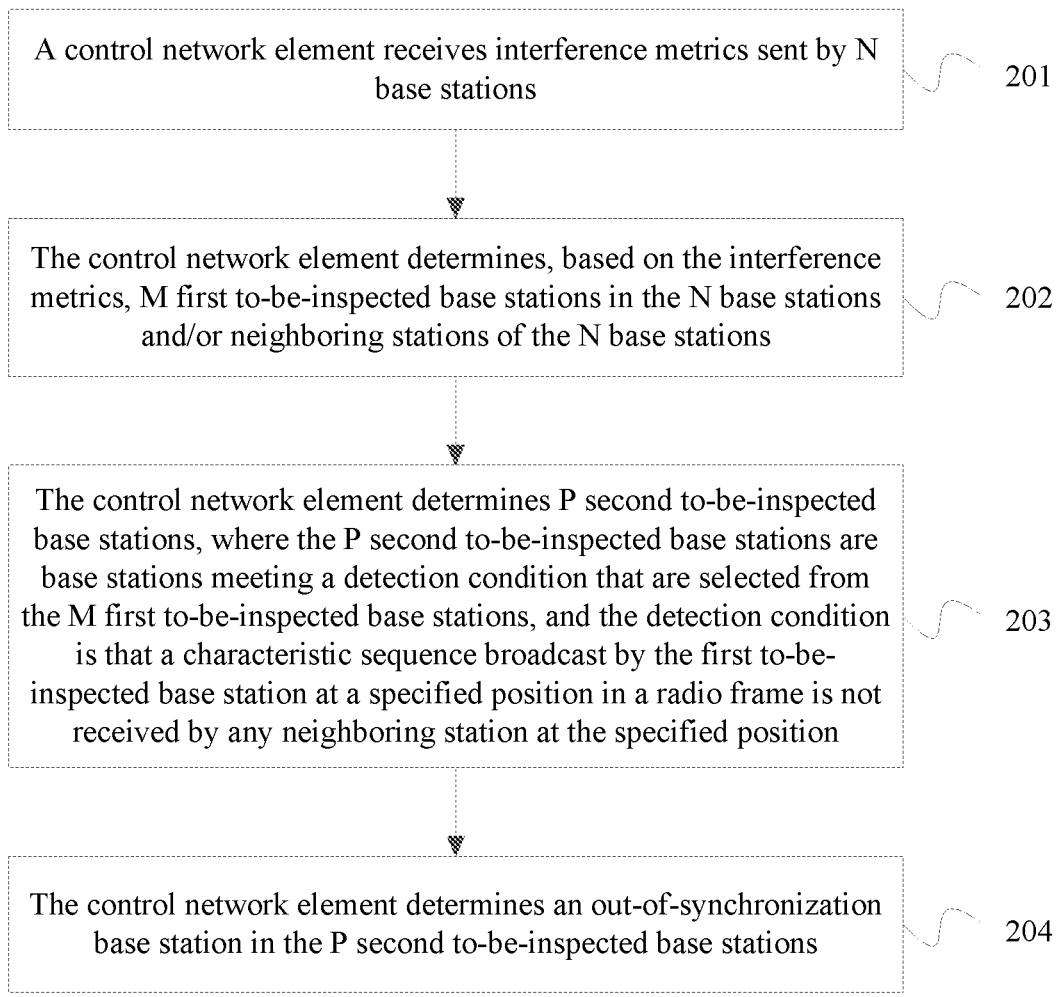
FIG. 2 is a schematic flowchart of Embodiment 1 of an out-of-synchronization determining method according to embodiments of this application.

FIG. 2 is a schematic flowchart of Embodiment 1 of an out-of-synchronization determining method according to an embodiment of this application. This embodiment of this application provides an out-of-synchronization determining method. The method may be performed by any apparatus performing an out-of-synchronization determining method, and the apparatus may be implemented by software and/or hardware. In this embodiment, the apparatus may be integrated in a control network element. As shown in FIG. 2, the method in this embodiment may include the following steps.

Step 201: A control network element receives interference metrics sent by N base stations.

The interference metrics include first interference and noise (IN) IN 1, second interference and noise IN 2, and third interference and noise IN 3, and the first interference and noise, the second interference and noise, and the third interference and noise are interference received in different uplink subframe symbols. In addition, N is a positive integer.

Step 202: The control network element determines, based on the interference metrics, M first to-be-inspected base stations in the N base stations and/or neighboring stations of the N base stations.

In this embodiment, the N base stations each monitor interference metrics of all cells of the local base station. When an interference metric of a cell is found to exceed a preset gate, the base stations need to summarize cell-specific interference to base station-specific interference, and report IN 1, IN 2, and IN 3 to the control network element, where IN 1, IN 2, and IN 3 are interference in different symbols. The reporting is usually performed at a base station level or a frequency channel number level. For cells with a same frequency channel number, that is, for cells with a same frequency band central point, the base stations report metrics of a cell that receives strongest interference. If one base station includes a plurality of frequency channel numbers, the base station reports a plurality of messages to the control network element, or may report to the control network element one message carrying information about the plurality of frequency channel numbers.

After receiving the interference metrics reported by the base stations, the control network element determines M first to-be-inspected base stations in the N base stations and/or neighboring stations of the N base stations, and performs subsequent detection. Positions and characteristics of interference symbols of an out-of-synchronization base station are different from those of a synchronized base station. Therefore, whether the base stations are out of synchronization may be determined based on characteristics such as positions of interference symbols, interference intensity, and a quantity of base stations that are interfered with, to select the first to-be-inspected base stations.

A major function for the base stations to monitor and report the interference metrics is to discover interference resulting from a clock being out of synchronization and trigger detection, while preventing other interference from triggering an out-of-synchronization detection process. The other interference includes interference characteristics caused by atmospheric waveguide and major events, where the major event is usually a large traffic event. Before a base station reports interference metrics to the control network element, the base station needs to determine whether the detected interference metrics have exceeded a preset gate due to atmospheric waveguide or a major event. If the interference increase is caused by atmospheric waveguide or a major event, the base station does not report the interference metrics to the control network element.

In addition, there are three cases for the control network element to determine the M first to-be-inspected base stations in the N base stations and/or the neighboring stations of the N base stations: (1) The control network element determines the M first to-be-inspected base stations in the N base stations; (2) The control network element determines the M first to-be-inspected base stations in the neighboring stations of the N base stations; and (3) The control network element determines the M first to-be-inspected base stations in the N base stations and the neighboring stations of the N base stations.

As long as a clock is out of synchronization to cause interference, interference is definitely received in the last several symbols of an uplink subframe of the base station (where the interference may be received by a synchronized base station or an out-of-synchronization base station). Therefore, if interference is found to be received in the last several symbols of an uplink subframe of a base station, presence of a possible out-of-synchronization clock can be determined. Therefore, a base station needs to detect interference statuses of all cells of the base station in every period.

Figure 3:
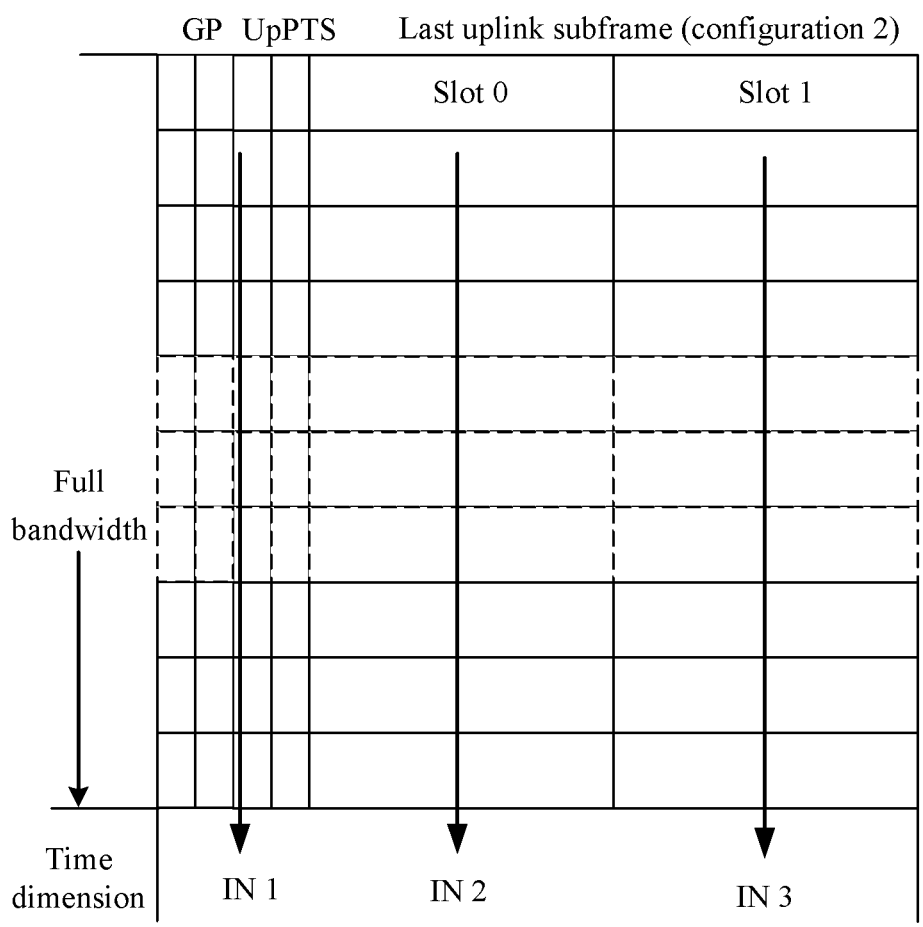
FIG. 3 is a schematic diagram of an average interference power of an uplink subframe.
Figure 4:
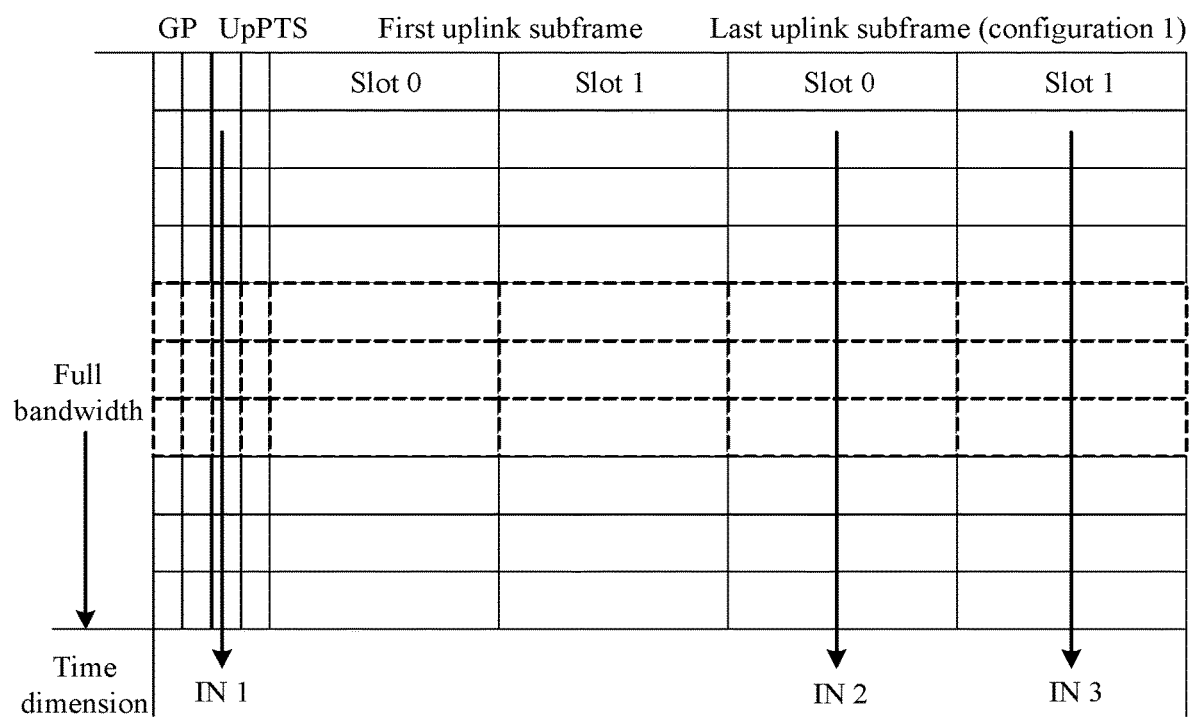
FIG. 4 is a schematic diagram of an average interference power of an uplink subframe.

FIG. 3 is a schematic diagram of an average interference power of an uplink subframe, and FIG. 4 is a schematic diagram of an average interference power of an uplink subframe. As shown in FIG. 3 and FIG. 4, a base station calculates an average value of uplink interference in different symbols in every period. If an average interference power in the last several symbols of the last uplink subframe of a cell is greater than the gate, it indicates that interference characteristics of this cell conform to characteristics of interference resulting from a clock being out of synchronization. In this embodiment, the base station calculates interference of IN 1, IN 2, and IN 3 in every period. If an average interference power of IN 3 in a slot 1 (Slot 1) in the last uplink subframe is greater than the gate, and it is determined that the interference increase is not caused by a major event, the base station reports all the IN 1, IN 2, and IN 3 to the control network element. It should be noted that this embodiment is described by using a configuration 1 and a configuration 2 as examples. In actual application, this embodiment is applicable to any configurations.

In addition, it should be noted that as shown in FIG. 3 and FIG. 4, IN 2 may be the first several symbols in slot 0 of the last subframe, for example, the first four symbols in slot 0. FIG. 3 and FIG. 4 show a complete slot 0, where a normal cyclic prefix (Normal CP) is seven symbols, and an extended cyclic prefix (Extended CP) is six symbols. Alternatively, IN 3 may be the last several symbols, for example, four symbols, in slot 1. FIG. 3 and FIG. 4 show a complete slot 1.

In addition, when a clock of an out-of-synchronization base station is shifted to cause interference, the out-of-synchronization base station and a synchronized base station differ in interference intensity, positions of interference symbols, and a quantity of interference-affected base stations. The out-of-synchronization base station can be directly located or a range of out-of-synchronization base stations can be narrowed down based on these characteristics. In actual application, determining of the first to-be-inspected base stations may include the following several cases.

Case 1: If N is less than a preset threshold, the control network element determines all the N base stations as the first to-be-inspected base stations.

Figure 5A:
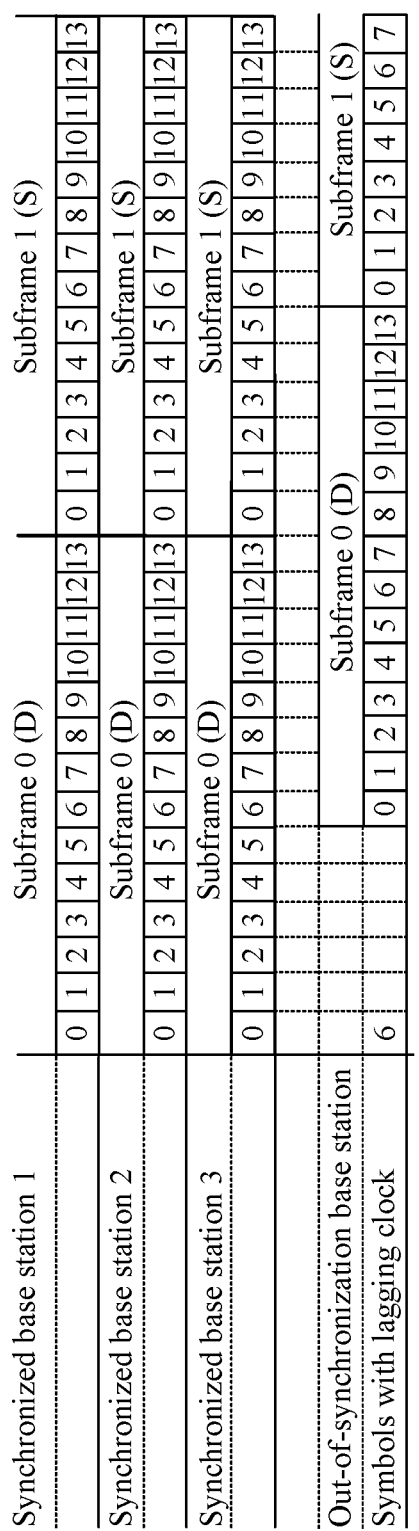
FIG. 5A and FIG. 5B are a schematic diagram of a base station reporting interference metrics.
Figure 5B:
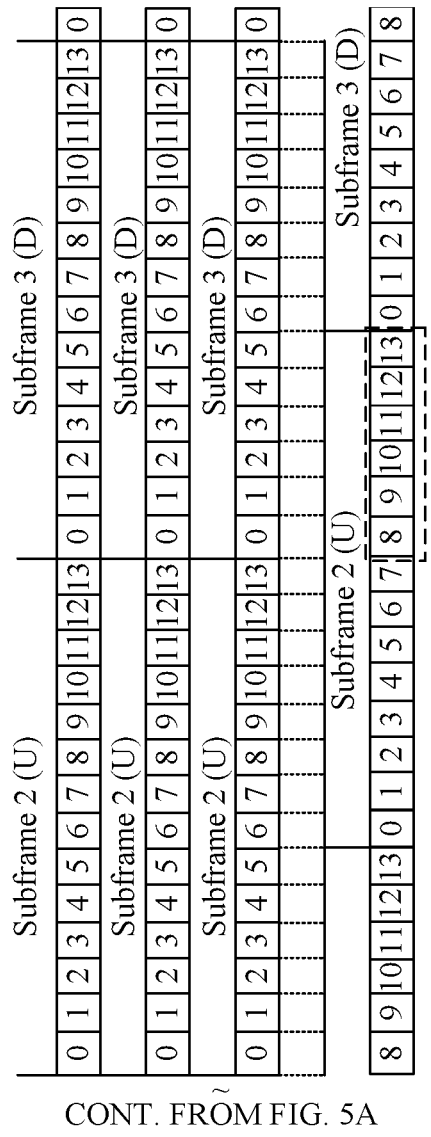

FIG. 5A and FIG. 5B are a schematic diagram of a base station reporting interference metrics. As shown in FIG. 5A and FIG. 5B, a person skilled in the art may understand that the last several symbols (8, 9, 10, 11, 12, and 13) in an uplink subframe 2(U) of an out-of-synchronization base station receive interference from downlink subframes 3(D) of a synchronized base station 1, a synchronized base station 2, and a synchronized base station 3. That is, the out-of-synchronization base station receives interference in the last several symbols of slot 1. With reference to FIG. 2 and FIG. 3, in this case, only IN 3 of the out-of-synchronization base station receives interference, and usually, only the out-of-synchronization base station reports interference. Therefore, if a quantity of base stations reporting interference metrics to the control network element during a period is less than the preset threshold, that is, N is less than the preset threshold, the N base stations reporting the interference metrics may be considered to be possibly out of synchronization. In this case, the N base stations reporting the interference metrics may be directly determined as the first to-be-inspected base stations, in which case N is equal to M. The preset threshold may be set based on an actual situation or experience, for example, set to 1 or 2. A specific value of the preset threshold is not limited in this embodiment.

Case 2: If N is greater than or equal to a preset threshold, the control network element determines whether IN 1, IN 2, and IN 3 of the N base stations are all greater than a preset gate; and if IN 1, IN 2, and IN 3 of the N base stations are all greater than the preset gate, the control network element determines, in descending order of average values of IN 1, IN 2, and IN 3, first M base stations as the first to-be-inspected base stations.

Figure 6A:
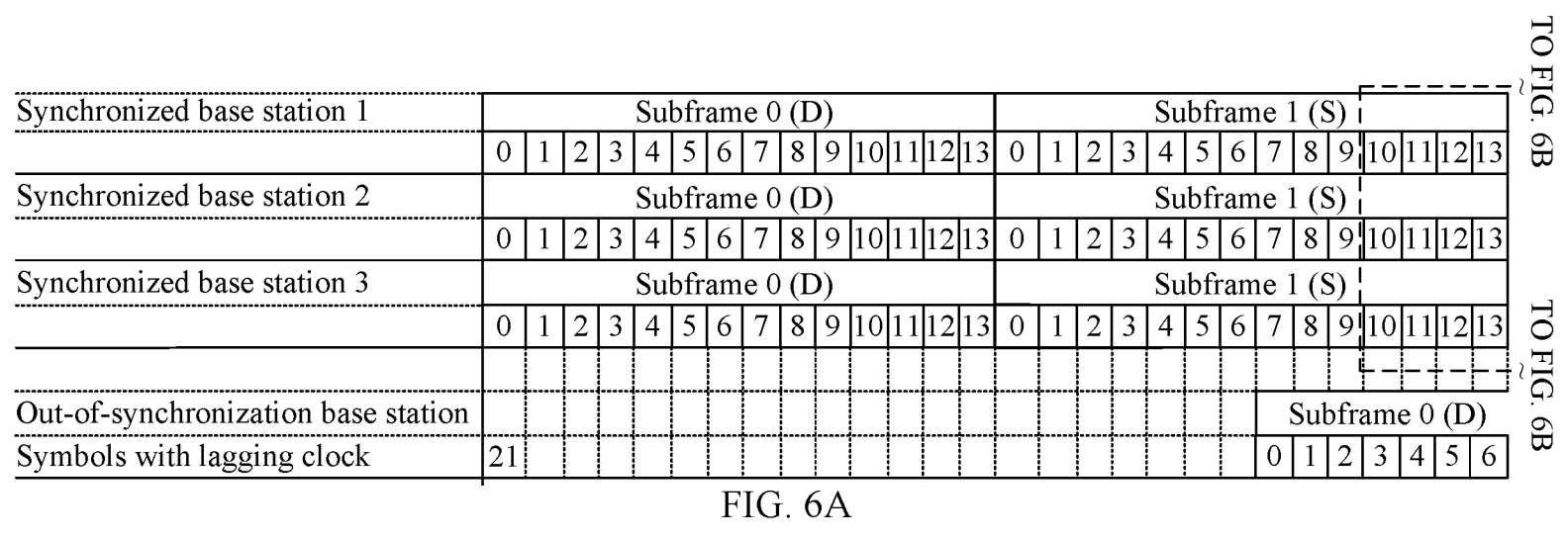
Figure 6B:
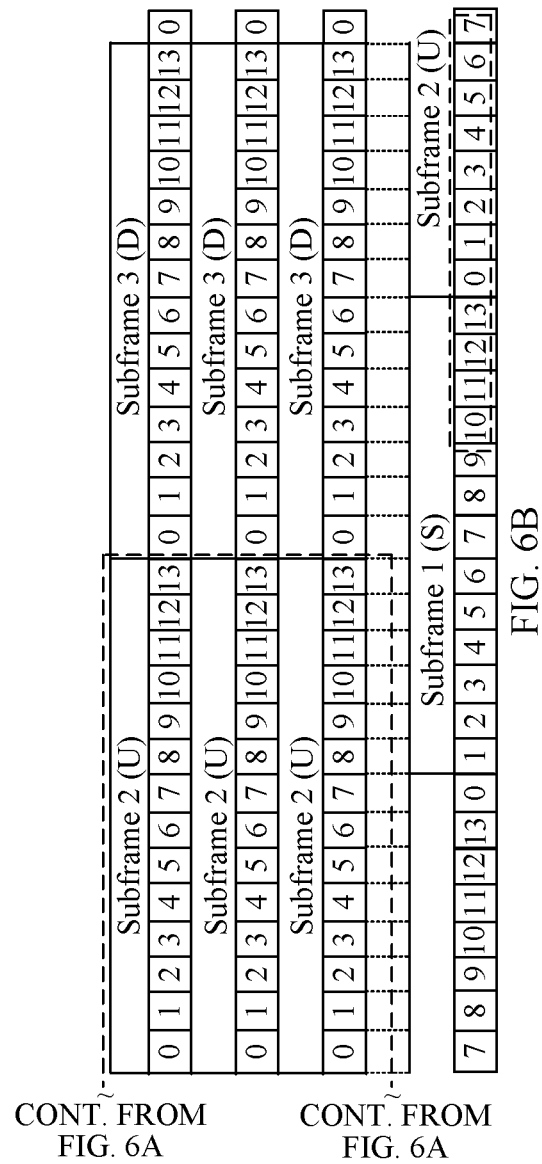

FIG. 6A and FIG. 6B are a schematic diagram of a base station reporting interference metrics. As shown in FIG. 6A and FIG. 6B, a person skilled in the art may understand that uplink subframes 2(U) and the last several symbols in special subframes 1(S) of a synchronized base station 1, a synchronized base station 2, and a synchronized base station 3 receive interference from a downlink subframe 0(D) of an out-of-synchronization base station. That is, the synchronized base station 1, the synchronized base station 2, and the synchronized base station 3 receive interference in slot 0 and slot 1. In addition, an uplink subframe 2(U) and the last several symbols in a special subframe 1(S) of the out-of-synchronization base station receive interference from downlink subframes 3(D) of the synchronized base station 1, the synchronized base station 2, and the synchronized base station 3. With reference to FIG. 2 and FIG. 3, in this scenario, interference characteristics of the synchronized base stations and the out-of-synchronization base station are similar, and IN 1, IN 2, and IN 3 receive interference in both cases. Therefore, both the synchronized base stations and the out-of-synchronization base station report interference. Therefore, if a quantity of base stations reporting interference metrics to the control network element during a period is greater than or equal to the preset threshold, that is, N is greater than or equal to the preset threshold, the control network element determines whether IN 1, IN 2, and IN 3 of the base stations are all greater than the preset gate; and if IN 1, IN 2, and IN 3 of the base stations are all greater than the preset gate, the control network element determines M base stations receiving strongest average interference as the first to-be-inspected base stations. To be specific, the control network element determines, in descending order of average values of the interference metrics, first M base stations as the first to-be-inspected base stations. For example, the control network element determines, in descending order of average values of IN 1, IN 2, and IN 3, first M base stations as the first to-be-inspected base stations. The preset threshold may be, for example, 2.

Case 3: If N is greater than or equal to a preset threshold, and IN 1 of the N base stations is less than a preset gate, the control network element determines a quantity of neighbor relationships between each neighboring station of the base stations and the N base stations; and the control network element determines, in descending order of neighbor relationship quantities, first M base stations as the first to-be-inspected base stations, where the neighbor relationships include neighbor relationships between neighboring stations of the base stations and the N base stations.

Figures 7A, 7B:
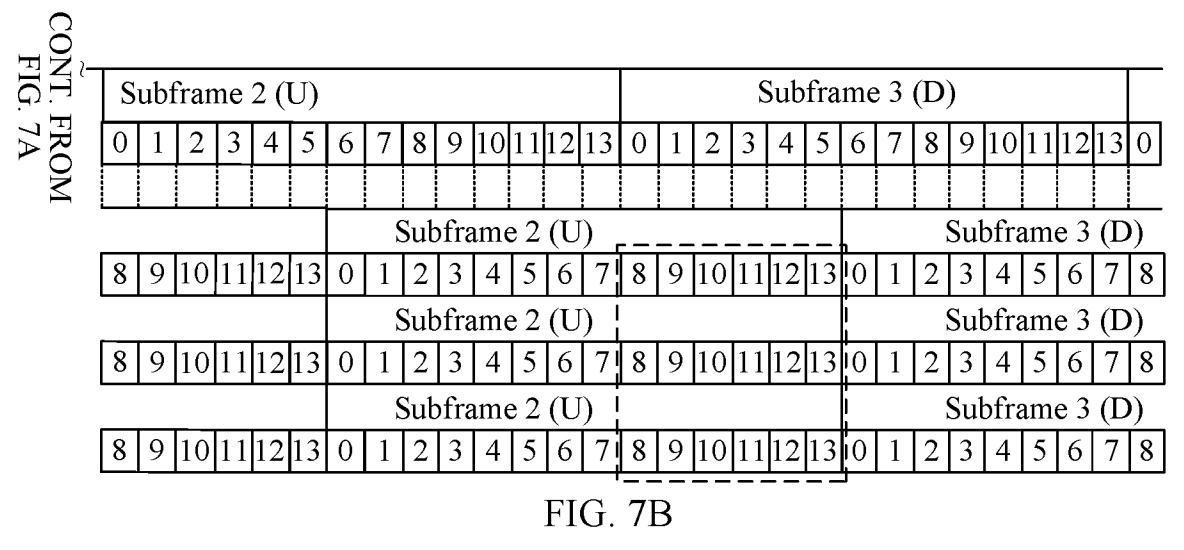

FIG. 7A and FIG. 7B are a schematic diagram of a base station reporting interference metrics. As shown in FIG. 7A and FIG. 7B, a person skilled in the art may understand that the last several symbols in uplink subframes 2(U) of a synchronized base station 1, a synchronized base station 2, and a synchronized base station 3 receive interference from a downlink subframe 3(D) of an out-of-synchronization base station. That is, the synchronized base station 1, the synchronized base station 2, and the synchronized base station 3 receive interference in slot 1. With reference to FIG. 2 and FIG. 3, in this scenario, only IN 3 of the synchronized base stations receives interference, and therefore only the synchronized base stations report interference. Therefore, if a quantity of base stations reporting interference metrics to the control network element during a period is greater than or equal to the preset threshold, and IN 1 of the N base stations is less than the preset gate, the first to-be-inspected base stations are selected from the neighboring stations of the base stations. In actual application, the control network element determines a quantity of neighbor relationships between each neighboring station of the base stations and the N base stations, and determines M base stations with largest quantities of neighbor relationships as the first to-be-inspected base stations. The preset threshold may be, for example, 2.

For example, if M is 2, the N base stations are a base station A, a base station B, a base station C, a base station D, and a base station E, and neighboring stations of the base station A are a base station a, a base station b, and a base station c, neighboring stations of the base station B are the base station a, a base station d, and the base station c, neighboring stations of the base station C are the base station A, the base station a, the base station b, and the base station d, neighboring stations of the base station D are the base station A, the base station a, the base station c, and the base station d, and neighboring stations of the base station E are the base station A, the base station B, the base station b, the base station c, a base station e, a base station f, a base station g, a base station h, and a base station i. Then the base station a has neighbor relationships with the base station A, the base station B, the base station C, and the base station D, and therefore a quantity of neighbor relationships of the base station a is 4; the base station b has neighbor relationships with the base station A, the base station C, and the base station E, and therefore a quantity of neighbor relationships of the base station b is 3. Similarly, it can be determined that a quantity of neighbor relationships of the base station c is 4, a quantity of neighbor relationships of the base station d is 3, a quantity of neighbor relationships of the base station e is 1, a quantity of neighbor relationships of the base station f is 1, a quantity of neighbor relationships of the base station g is 1, a quantity of neighbor relationships of the base station h is 1, and a quantity of neighbor relationships of the base station i is 1. After determining the quantities of neighbor relationships, the control network element determines, in descending order of the neighbor relationship quantities, the base station a and the base station c as the first to-be-inspected base stations.

Scenario 4: If N is greater than or equal to a preset threshold, determine, in descending order of average values of the interference metrics IN 1, IN 2, and IN 3, first L base stations as the first to-be-inspected base stations, and determine, in descending order of neighbor relationship quantities, first P base stations as the first to-be-inspected base stations, where the neighbor relationships include neighbor relationships between neighboring stations of the base stations and the N base stations, L and P are integers, and a sum of L and P is equal to M.

If a quantity of base stations reporting interference metrics to the control network element during a period is greater than or equal to the preset threshold, that is, N is greater than or equal to the preset threshold, the first to-be-inspected base stations include two portions. In a first portion, the first L base stations may be selected as the first to-be-inspected base station as in the second case, that is, in descending order of average values of the interference metrics. In a second portion, the first P base stations may be determined as the first to-be-inspected base station as in the third case, that is, in descending order of neighbor relationship quantities. A specific manner of determining is similar to those in the second case and the third case. No more details are described herein.

Step 203: The control network element determines P second to-be-inspected base stations, where the P second to-be-inspected base stations are base stations meeting a detection condition that are selected from the M first to-be-inspected base stations, and the detection condition is that a characteristic sequence broadcast by the first to-be-inspected base station at a specified position in a radio frame is not received by any neighboring station at the specified position. P is an integer, and P is less than or equal to M. In this embodiment, after determining the M first to-be-inspected base stations, the control network element selects the second to-be-inspected base stations from the M first to-be-inspected base stations. In actual application, according to a principle of strict clock synchronization required by a TDD system, the first to-be-inspected base station sends the characteristic sequence at the preset position in a preset radio frame, and if a clock is synchronized, the neighboring stations of the first to-be-inspected base station can normally receive the characteristic sequence at the preset position in the preset radio frame; and if a clock is out of synchronization, the neighboring stations of the first to-be-inspected base station are not able to detect the characteristic sequence because of missing a reception detection window.

Similarly, a neighboring station of the first to-be-inspected base station sends the characteristic sequence, and if the first to-be-inspected base station detects the sequence, the first to-be-inspected base station can also be determined as being synchronized. If none of the neighboring stations can receive the characteristic sequence sent by the first to-be-inspected base station, and the first to-be-inspected base station cannot receive the characteristic sequence sent by the neighboring stations, the first to-be-inspected base station is determined to be possibly out of synchronization, and the first to-be-inspected base station is determined as the second to-be-inspected base station.

In this embodiment, a neighboring station of a first to-be-inspected base station sends a characteristic sequence only when the neighboring station is also a first to-be-inspected base station. In other words, in this embodiment, only the first to-be-inspected base stations send the characteristic sequence. However, this application is not limited such that only the first to-be-inspected base stations send the characteristic sequence. A manner and a principle of sending the characteristic sequence by a neighboring station and receiving the characteristic sequence by the first to-be-inspected base station are similar to the manner and the principle of sending the characteristic sequence by the first to-be-inspected base station and receiving the characteristic sequence by the neighboring station. No more details are described herein.

Optionally, FIG. 8 is a schematic flowchart of determining a second to-be-inspected base station by a control network element according to an embodiment of this application. As shown in FIG. 8, step 202 may include the following steps.

Step 801: The control network element sends a first notification message to each of the M first to-be-inspected base stations, where the first notification message is used to instruct the first to-be-inspected base station to broadcast a characteristic sequence at a preset position in a radio frame.

The control network element sends the first notification message to the determined M first to-be-inspected base stations, and each of the first to-be-inspected base stations broadcasts the characteristic sequence at the preset position in a radio frame based on the received notification message. The preset position in a radio frame may be, for example, a GP zone of an S subframe, and certainly, may be other positions in the radio frame. It should be noted that if different first to-be-inspected base stations broadcast the characteristic sequence at the same time, they perform broadcasting at the specified position in different radio frames. For example, when a first to-be-inspected base station A and a first to-be-inspected base station B broadcast the characteristic sequence at the same time, the first to-be-inspected base station A sends the characteristic sequence at the specified position in a radio frame 801, and the first to-be-inspected base station B sends the characteristic sequence at the specified position in a radio frame 802.

Step 802: The control network element sends a second notification message to neighboring stations of the first to-be-inspected base stations, where the second notification message is used to instruct the neighboring station of the first to-be-inspected base station to receive the characteristic sequence at the preset position in a radio frame.

The control network element first needs to determine all neighboring stations of each of the first to-be-inspected base stations. In a specific implementation process, the control network element may send a query message to each of the first to-be-inspected base stations. Then the first to-be-inspected base station determines, in response to the query message, all base stations having neighbor relationships with the first to-be-inspected base station, and sends identification information of the neighboring stations to the control network element in a feedback message. In addition, if the control network element is deployed in a network manager, the control network element can directly query configuration information in the network manager for neighboring station information of each of the first to-be-inspected base stations. A specific manner of determining the neighboring stations of the first to-be-inspected base stations by the control network element is not limited in this embodiment.

Base on the feedback messages received, the control network element sends the second notification message to the base stations corresponding to the identification information. Each neighboring station of the first to-be-inspected base station receives the characteristic sequence at the preset position in a radio frame based on the second notification message.

Step 803: The control network element receives a first response message sent by each neighboring station of the first to-be-inspected base stations, where the first response message is used to indicate whether the neighboring station of the first to-be-inspected base station has received the characteristic sequence.

After receiving the characteristic sequence at the preset position in a radio frame, each neighboring station of the first to-be-inspected base station feeds back a reception result to the control network element. To be specific, each neighboring station sends a first response message to the control network element, to inform the control network element whether the neighboring station has received the characteristic sequence at the preset position in the radio frame.

In addition, if the first to-be-inspected base station A sends the characteristic sequence at the specified position in a radio frame 801, and the first to-be-inspected base station B sends the characteristic sequence at the specified position in a radio frame 802, neighboring stations of the first to-be-inspected base station A and the first to-be-inspected base station B receive the characteristic sequence at the specified position in the radio frame 801 and the specified position in the radio frame 802, so that it can be determined whether any neighboring station has received the characteristic sequence at the specified position in the radio frame 801, and whether any neighboring station has received the characteristic sequence at the specified position in the radio frame 802.

Step 804: If determining, based on the first response messages, that no neighboring station of the first to-be-inspected base station has received the characteristic sequence, the control network element determines the first to-be-inspected base station as the second to-be-inspected base station.

According to a principle of strict clock synchronization required by a TDD system, after the first to-be-inspected base station sends the characteristic sequence at a GP zone in an S subframe, if all base stations are clock-synchronized, the neighboring stations of the first to-be-inspected base station can normally receive the characteristic sequence at the GP zone in the S subframe. If a clock of the first to-be-inspected base station is out of synchronization, the neighboring stations of the first to-be-inspected base station are possibly not able to detect the characteristic sequence because of missing a reception detection window. Therefore, if determining, based on the first response messages sent by the neighboring stations of the first to-be-inspected base station, that no neighboring station of a first to-be-inspected base station has received the characteristic sequence sent by the first to-be-inspected base station at the preset position in a radio frame, the control network element can determine this first to-be-inspected base station as the second to-be-inspected base station, for further confirmation later. In addition, if a first to-be-inspected base station is also a neighboring station of another first to-be-inspected base station, this first to-be-inspected base station not only needs to determine whether neighboring stations of the first to-be-inspected base station have received the characteristic sequence, but also needs to determine whether the first to-be-inspected base station has received the characteristic sequence sent by the another first to-be-inspected base station at the preset position in a radio frame.

For example, first to-be-inspected base stations include a base station A, a base station B, and a base station C. Neighboring stations of the base station A are a base station a, a base station b, and a base station c; neighboring stations of the base station B are the base station a, a base station d, and the base station c; and neighboring stations of the base station C are the base station A, the base station a, the base station b, and the base station d. After the base station A, the base station B, and the base station C each send the characteristic sequence at the preset position in a radio frame, their respective neighboring stations receive the characteristic sequence at the preset position in the radio frame. If none of the neighboring stations of the base station A, that is, the base station a, the base station b, and the base station c, has received the characteristic sequence at the preset position in the radio frame, and the base station A has not received the characteristic sequence sent by the base station C either, the base station A is determined as the second to-be-inspected base station.

In the second to-be-inspected base station determining method provided in this embodiment, the first to-be-inspected base stations each send the characteristic sequence at the preset position in a radio frame, and the control network element determines whether all neighboring stations of each first to-be-inspected base station have received the characteristic sequence at the preset position in the radio frame. If a clock of a first to-be-inspected base station is out of synchronization, neighboring stations of the first to-be-inspected base station are possibly not able to detect the characteristic sequence because of missing a reception detection window. Therefore, the second to-be-inspected base stations that are possibly out of synchronization can be determined, which makes determining of second to-be-inspected base stations more accurate.

Figure 9:
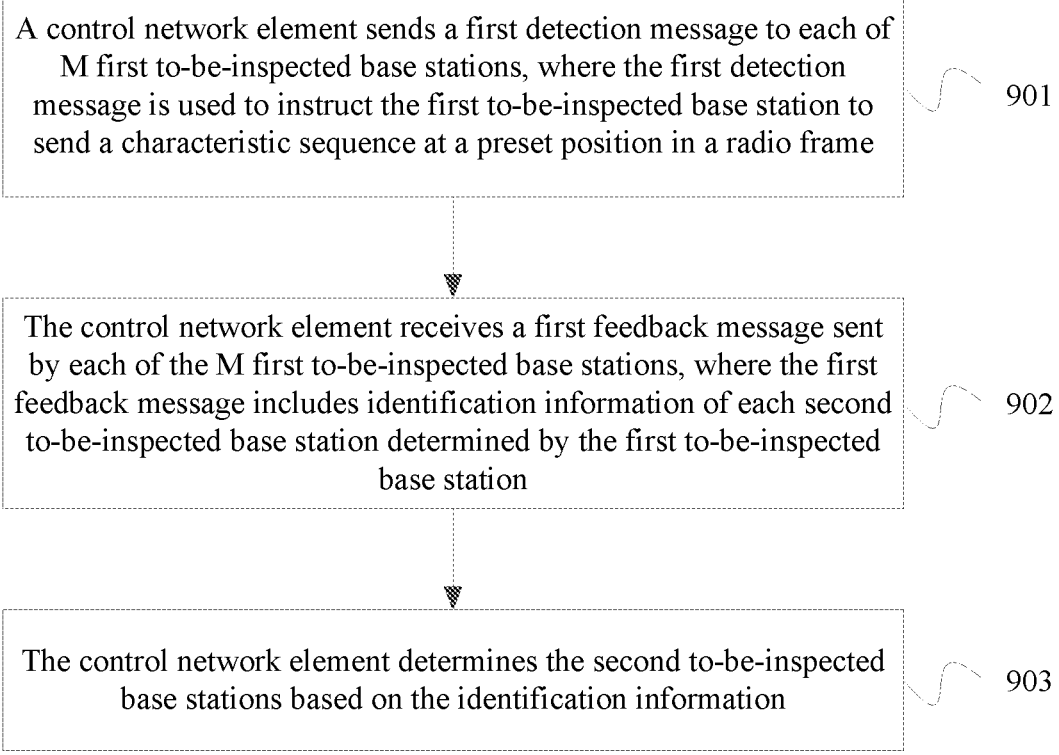
FIG. 9 is a schematic flowchart of determining a second to-be-inspected base station by a control network element according to an embodiment of this application.

Optionally, FIG. 9 is a schematic flowchart of determining a second to-be-inspected base station by a control network element according to an embodiment of this application. The manner of determining the second to-be-inspected base station in this embodiment differs from the manner of determining the second to-be-inspected base station in FIG. 8 in that in this embodiment, after each of the first to-be-inspected base stations sends the characteristic sequence at the preset position in a radio frame, and neighboring stations of each of the first to-be-inspected base stations receive the characteristic sequence at the preset position in the radio frame, the neighboring station sends a result whether the neighboring station has received the characteristic sequence to the first to-be-inspected base station, and the first to-be-inspected base station determines whether all neighboring stations have received the characteristic sequence, to determine the second to-be-inspected base station, and send identification information of the second to-be-inspected base station to the control network element. As shown in FIG. 9, step 202 may include the following steps.

Step 901: The control network element sends a first detection message to each of the M first to-be-inspected base stations, where the first detection message is used to instruct the first to-be-inspected base station to send a characteristic sequence at a preset position in a radio frame.

The control network element may send the first detection message to each of the M first to-be-inspected base stations, where the first detection message carries a mapping relationship between base station identification information and radio frames. Each of the first to-be-inspected base stations searches for all neighboring stations of the first to-be-inspected base station in response to the first detection message that is received, and sends a notification message to all the neighboring stations, where the notification message is used to instruct the neighboring stations to receive the characteristic sequence at the preset position in a radio frame. In addition, each of the first to-be-inspected base stations determines, based on the mapping relationship between base station identification information and radio frames, a radio frame corresponding to identification information of the first to-be-inspected base station, that is, determines a radio frame in which the first to-be-inspected base station sends the characteristic sequence at the preset position. After each of the first to-be-inspected base stations sends the characteristic sequence at the preset position in the determined radio frame, all the neighboring stations of the first to-be-inspected base station receive the characteristic sequence at the preset position in the corresponding radio frame. In addition, every neighboring station returns a response message to the first to-be-inspected base station, where the response message carries result information whether the neighboring station has received the characteristic sequence. The first to-be-inspected base station determines the second to-be-inspected base station based on the result information in the response messages. In a specific implementation process, if determining, based on the response messages, that no neighboring station of the first to-be-inspected base station has received the characteristic sequence at the preset position in the corresponding radio frame, the first to-be-inspected base station determines the first to-be-inspected base station as the second to-be-inspected base station.

Step 902: The control network element receives a first feedback message sent by each of the M first to-be-inspected base stations, where the first feedback message includes identification information of each second to-be-inspected base station determined by the first to-be-inspected base station.

After determining the second to-be-inspected base station, each of the first to-be-inspected base stations sends the identification information of the second to-be-inspected base station to the control network element in the first feedback message. If the first to-be-inspected base station determines that all neighboring stations of the first to-be-inspected base station have received the characteristic sequence at the preset position in the radio frame, it indicates that the clock of the first to-be-inspected base station is not out of synchronization. In this case, the first to-be-inspected base station may send no first feedback message to the control network element, or a first feedback message sent by the first to-be-inspected base station to the control network element carries no base station identification information.

Step 903: The control network element determines the second to-be-inspected base stations based on the identification information.

After receiving the first feedback message sent by the first to-be-inspected base station, the control network element determines a base station corresponding to the identification information in the first feedback message as the second to-be-inspected base station. In addition, if the control network element receives no first feedback message sent by the first to-be-inspected base station, or a first feedback message received carries no base station identification information, the control network element determines that no second to-be-inspected base station is present. In this case, the clock of the first to-be-inspected base station is synchronized.

In the second to-be-inspected base station determining method provided in this embodiment, each of the first to-be-inspected base stations sends the characteristic sequence at the preset position in a radio frame, and determines whether all neighboring stations have received the characteristic sequence at the preset position in the radio frame, thereby determining whether the first to-be-inspected base station itself is the second to-be-inspected base station, and sending the determining result to the control network element. In this way, efficiency in determining second to-be-inspected base stations can be improved.

Step 204: The control network element determines an out-of-synchronization base station in the P second to-be-inspected base stations.

In this embodiment, after the control network element has determined the P second to-be-inspected base stations, the control network element determines the out-of-synchronization base station through silence-based detection. The control network element finally determines the out-of-synchronization base station through reception and sending of the characteristic sequence at the preset position in radio frames, and silence-based detection, thereby improving accuracy in determining out-of-synchronization base stations.

Optionally, FIG. 10 is a schematic flowchart of determining an out-of-synchronization base station in P second to-be-inspected base stations by a control network element according to an embodiment of this application. As shown in FIG. 10, step 203 may include the following steps.

Step 1001: The control network element sends a third notification message to the P second to-be-inspected base stations and a fourth notification message to neighboring stations of the second to-be-inspected base stations in turn, where after receiving second response messages sent by neighboring stations of an $i^{th}$ second to-be-inspected base station, the control network element sends the third notification message to an $(i+1)^{th}$ second to-be-inspected base station, and sends the fourth notification message to neighboring stations of the $(i+1)^{th}$ second to-be-inspected base station.

The third notification message is used to instruct each of the second to-be-inspected base stations to stay silent in a preset radio frame, the fourth notification message is used to instruct the neighboring station to detect interference when the second to-be-inspected base station is silent, and the second response message is used to indicate whether interference received by the neighboring station of the second to-be-inspected base station that is detected by the neighboring base station has changed when the second to-be-inspected base station is silent.

The control network element sends the third notification message to the P second to-be-inspected base stations and the fourth notification message to the neighboring stations of the second to-be-inspected base stations in turn. The $i^{th}$ second to-be-inspected base station stays silent in the present radio frame after having received the third notification message. The preset radio frame may be several consecutive radio frames. For example, the second to-be-inspected base station is instructed to stay silent in the second radio frame to the seventh radio frame. Alternatively, the preset radio frame may be several radio frames that are not consecutive. For example, the second to-be-inspected base station is instructed to stay silent in the second radio frame, the fourth radio frame, the sixth radio frame, and the seventh radio frame.

In addition, the control network element further sends the fourth notification message to neighboring stations of the second to-be-inspected base station, to instruct all the neighboring stations of the second to-be-inspected base station to detect interference in the preset radio frame when the second to-be-inspected base station is silent. For example, if a second to-be-inspected base station is silent in the second, fourth, sixth, and seventh radio frames, all neighboring stations of the second to-be-inspected base station detect interference several seconds later, to ensure that the neighboring stations first perform detection that covers an entire possible period of silence, to improve accuracy of interference detection. In actual application, the neighboring stations of the second to-be-inspected base station receive the fourth notification message, and detect uplink interference in each radio frame and perform silence map matching several seconds later, to determine whether interference changing matches a silence map when the second to-be-inspected base station is silent.

When the neighboring stations of the $i^{th}$ second to-be-inspected base station complete detection, the neighboring stations of the $i^{th}$ second to-be-inspected base station send second response messages to the control network element, to inform the control network element whether interference received by the neighboring stations has changed when the second to-be-inspected base station is silent. After receiving the second response messages sent by the neighboring stations of the $i^{th}$ second to-be-inspected base station, the control network element sends the third notification message to the $(i+1)^{th}$ second to-be-inspected base station, and sends the fourth notification message to the neighboring stations of the $(i+1)^{th}$ second to-be-inspected base station. The neighboring stations of the $(i+1)^{th}$ second to-be-inspected base station detect interference, and report detection results to the control network element. So the process goes on, until all the P second to-be-inspected base stations are inspected.

In actual application, after a neighboring station detects interference and performs silence map matching in each radio frame, if interference changing matches the silence map, indicating that interference received by the neighboring station has changed when the second to-be-inspected base station is silent (duration and frequency of interference decrease are synchronized with silence of the second to-be-inspected base station), the neighboring station records the first radio frame number (or an $N^{th}$ radio frame number, which is not limited in this application, provided that consistency is ensured among all base stations) that currently matches the silence map, and sends the recorded radio frame number to the control network element in a second response message.

Step 1002: The control network element determines the out-of-synchronization base station based on the second response messages.

Interference is caused by an out-of-synchronization base station transmitting power in incorrect timing. Therefore, that the control network element determines an out-of-synchronization base station based on the second response messages includes: If determining, based on the second response messages, that the interference detected by the neighboring stations of the second to-be-inspected base station in the preset radio frame has changed when the second to-be-inspected base station is silent in the preset radio frame, the control network element determines the second to-be-inspected base station as the out-of-synchronization base station. In other words, if the interference received by the neighboring stations of the second to-be-inspected base station is eliminated after the second to-be-inspected base station becomes silent in all downlink subframes, the second to-be-inspected base station can be determined as the out-of-synchronization base station; if the interference received by the neighboring stations is not eliminated, the second to-be-inspected base station is a synchronized base station. In a specific implementation process, after receiving radio frame numbers carried in the second response messages, the control network element determines whether there are radio frame numbers reported by two neighboring stations of a second to-be-inspected base station that are valid and have a difference of less than or equal to 1. If the control network element determines that there are radio frame numbers reported by two neighboring stations that are valid and have a difference of less than or equal to 1, the control network element determines the second to-be-inspected base station as an out-of-synchronization base station. In addition, after determining the out-of-synchronization base station, the control network element further gives alarm information, and lets the out-of-synchronization base station perform a self-healing operation, to prevent the out-of-synchronization base station from causing interference to other neighboring co-channel cells. For example, if a second to-be-inspected base station is silent in the second, fourth, sixth, and seventh radio frames, and neighboring stations of the second to-be-inspected base station detect that interference received by the neighboring stations is eliminated in an $N^{th}$, an $(N+2)^{th}$, an $(N+4)^{th}$, and an $(N+5)^{th}$ radio frames, the second to-be-inspected base station is determined as an out-of-synchronization base station. It should be noted that because the second to-be-inspected base station is possibly out of synchronization, the second radio frame of the second to-be-inspected base station may not be the second radio frame of its neighboring stations. Therefore, radio frames are not necessarily required to be consistent, provided that the neighboring station can detect that changing of the interference received by the neighboring station matches the silence map.

In the out-of-synchronization determining method provided in this embodiment, after the second to-be-inspected base station becomes silent in downlink in the preset radio frame, the neighboring stations detect interference in the preset radio frame, to determine whether interference received by the neighboring stations has changed when the second to-be-inspected base station is silent. If determining that the interference received by the neighboring stations of the second to-be-inspected base station in the preset radio frame has changed, and a changing pattern matches the silence map of the second to-be-inspected base station, the control network element can determine the second to-be-inspected base station as the out-of-synchronization base station. In this way, accuracy in determining out-of-synchronization base stations can be improved.

Optionally, FIG. 11 is another schematic flowchart of determining an out-of-synchronization base station by a control network element according to an embodiment of this application. The manner of determining the out-of-synchronization base station in this embodiment differs from the manner of determining the out-of-synchronization base station in FIG. 10 in that in this embodiment, each second to-be-inspected base station stays silent in a preset radio frame, and neighboring stations of the second to-be-inspected base station detect interference received by the neighboring stations in the preset radio frame, and send detection results to the second to-be-inspected base station. The second to-be-inspected base station determines whether the interference detected by all neighboring stations of the second to-be-inspected base station has changed, thereby determining an out-of-synchronization base station, and sending identification information of the out-of-synchronization base station to the control network element. As shown in FIG. 11, step 203 may include the following steps.

Step 1101: The control network element sends a second detection message to P second to-be-inspected base stations in turn, where after receiving a second feedback message sent by an $i^{th}$ second to-be-inspected base station, the control network element sends the second detection message to an $(i+1)^{th}$ second to-be-inspected base station, where the second detection message is used to instruct the second to-be-inspected base station to stay silent in a preset radio frame, and the second feedback message includes identification information of an out-of-synchronization base station determined by the second to-be-inspected base station.

After determining the P second to-be-inspected base stations, the control network element sends the second detection message to the second to-be-inspected base stations in turn, to instruct the second to-be-inspected base station to stay silent in a preset radio frame. After the control network element has received the second feedback message sent by the $i^{th}$ second to-be-inspected base station, the control network element sends the second detection message to the $(i+1)^{th}$ second to-be-inspected base station, thereby inspecting the second to-be-inspected base stations in turn.

After receiving the second detection message, the second to-be-inspected base station determines an out-of-synchronization base station in response to the second detection message, where the out-of-synchronization base station is a base station meeting a detection condition, and the detection condition is that interference detected by neighboring stations of the second to-be-inspected base station has changed when the second to-be-inspected base station is silent. In a specific implementation process, that the second to-be-inspected base station determines an out-of-synchronization base station in response to the detection message includes: The second to-be-inspected base station sends a notification message to all the neighboring stations, where the notification message is used to instruct the neighboring station to detect interference received by the neighboring station when the second to-be-inspected base station is silent; the second to-be-inspected base station is set to be silent in the preset radio frame; and the second to-be-inspected base station receives a response message sent by each of the neighboring stations, and determines the out-of-synchronization base station based on the response messages, where the response message is used to indicate whether the interference detected by the neighboring station of the second to-be-inspected base station has changed when the second to-be-inspected base station is silent, if determining, based on the response messages, that the interference detected by the neighboring stations of the second to-be-inspected base station in the preset radio frame has changed when the second to-be-inspected base station is silent in the preset radio frame, the second to-be-inspected base station determines the second to-be-inspected base station as the out-of-synchronization base station.

In a specific implementation process, each of the second to-be-inspected base stations becomes silent in downlink in the present radio frame according to the silence map several seconds later. The neighboring stations of the second to-be-inspected base station detect uplink interference and perform map matching in each radio frame, to determine whether interference changing matches the silence map when the second to-be-inspected base station is silent. If the interference changing matches the silence map, indicating that the interference received by the neighboring stations has changed when the second to-be-inspected base station is silent, the neighboring stations record current radio frame numbers, and sends the recorded radio frame numbers to the second to-be-inspected base station in response messages. After receiving the radio frame numbers carried in the response messages, the second to-be-inspected base station determines whether there are radio frame numbers reported by two neighboring stations that are valid and have a difference of less than or equal to 1. If determining that there are radio frame numbers reported by two neighboring stations that are valid and have a difference of less than or equal to 1, the second to-be-inspected base station determines the second to-be-inspected base station as an out-of-synchronization base station, and reports identification information of the second to-be-inspected base station to the control network element in a second feedback message.

Step 1102: The control network element determines the out-of-synchronization base station based on the identification information.

The control network element determines, based on the identification information received, a base station corresponding to the identification information as the out-of-synchronization base station. In addition, the control network element further sends alarm information to the out-of-synchronization base station, and lets the out-of-synchronization base station perform a self-healing operation, to prevent the out-of-synchronization base station from causing interference to other neighboring co-channel cells.

In the out-of-synchronization determining method provided in this embodiment, after the second to-be-inspected base station becomes silent in downlink in the preset radio frame, the neighboring stations detect interference in the preset radio frame, to determine whether interference received by the neighboring stations has changed when the second to-be-inspected base station is silent. If determining that interference received by the neighboring stations in the preset radio frame has changed, the second to-be-inspected base station can determine the second to-be-inspected base station itself as the out-of-synchronization base station. The second to-be-inspected base station sends the determining result to the control network element, so that the control network element lets the out-of-synchronization base station perform a self-healing operation. In this way, efficiency in determining out-of-synchronization base stations can be improved.

In the out-of-synchronization determining method provided in this embodiment, the interference metrics sent by the N base stations are received, the M first to-be-inspected base stations are determined in the N base stations and/or the neighboring stations of the N base stations based on the interference metrics, and the P second to-be-inspected base stations are determined, where the P second to-be-inspected base stations are base stations meeting the detection condition that are selected from the M first to-be-inspected base stations, and the detection condition is that the characteristic sequence broadcast by the first to-be-inspected base station at the specified position in a radio frame is not received by any neighboring station at the specified position. Then the out-of-synchronization base station is determined in the P second to-be-inspected base stations. The control network element first selects the M first to-be-inspected base stations based on the interference metrics reported by the base stations, then selects the second to-be-inspected base stations meeting the detection condition depending on whether the characteristic sequence broadcast by the first to-be-inspected base station at the specified position in the radio frame can be received by the neighboring stations at the specified position, and finally determines the out-of-synchronization base station. Therefore, a range for determining an out-of-synchronization base station is narrowed down in different approaches, thereby improving accuracy in determining out-of-synchronization base stations.

Figure 12:
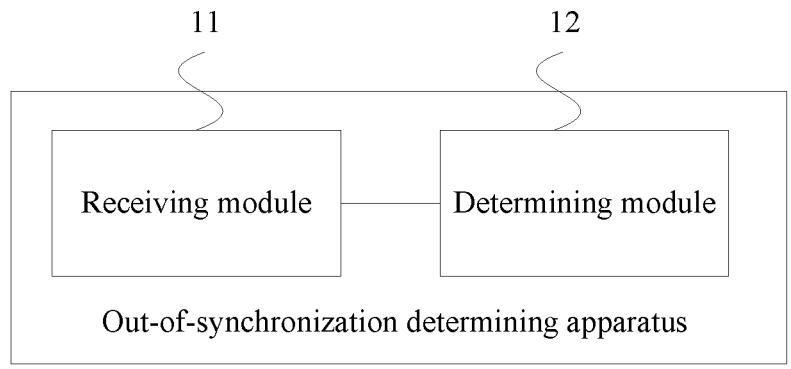
FIG. 12 is a schematic structural diagram of Embodiment 1 of an out-of-synchronization determining apparatus according to embodiments of this application.

FIG. 12 is a schematic structural diagram of Embodiment 1 of an out-of-synchronization determining apparatus according to the embodiments of this application. The determining apparatus may be a standalone control network element, or may be an apparatus integrated in a control network element. The apparatus may be implemented by software, hardware, or a combination of software and hardware. As shown in FIG. 12, the determining apparatus includes:

a receiving module 11, configured to receive interference metrics sent by N base stations, where the interference metrics include first interference and noise, second interference and noise, and third interference and noise, and the first interference and noise, the second interference and noise, and the third interference and noise are interference received in different uplink subframe symbols; and a determining module 12, configured to determine, based on the interference metrics, M first to-be-inspected base stations in the N base stations and/or neighboring stations of the N base stations; where the determining module 12 is further configured to determine P second to-be-inspected base stations, where the P second to-be-inspected base stations are base stations meeting a detection condition that are selected from the M first to-be-inspected base stations, and the detection condition is that a characteristic sequence broadcast by the first to-be-inspected base station at a specified position in a radio frame is not received by any neighboring station at the specified position; and the determining module 12 is further configured to determine an out-of-synchronization base station in the P second to-be-inspected base stations; where N and M are positive integers, P is an integer, and P is less than or equal to M.

Optionally, the receiving module 11 may be a receiver in a control network element or may integrate some processor functions, and correspondingly, the determining module 12 may be a processor in the control network element.

The out-of-synchronization determining apparatus provided in this embodiment of this application may perform the foregoing method embodiment. An implementation principle and a technical effect of the out-of-synchronization determining apparatus are similar to those of the method embodiment. No more details are described herein.

Optionally, the determining module 12 is configured to:

send a first notification message to each of the M first to-be-inspected base stations, where the first notification message is used to instruct the first to-be-inspected base station to broadcast the characteristic sequence at the preset position in a radio frame;

send a second notification message to neighboring stations of the first to-be-inspected base stations, where the second notification message is used to instruct the neighboring station of the first to-be-inspected base station to receive the characteristic sequence at the preset position in a radio frame;

receive a first response message sent by each neighboring station of the first to-be-inspected base stations, where the first response message is used to indicate whether the neighboring station of the first to-be-inspected base station has received the characteristic sequence; and if determining, based on the first response messages, that no neighboring station of the first to-be-inspected base station has received the characteristic sequence, determine the first to-be-inspected base station as the second to-be-inspected base station.

Optionally, the determining module 12 is configured to:

send a first detection message to each of the M first to-be-inspected base stations, where the first detection message is used to instruct the first to-be-inspected base station to send the characteristic sequence at the preset position in a radio frame;

receive a first feedback message sent by each of the M first to-be-inspected base stations, where the first feedback message includes identification information of each second to-be-inspected base station determined by the first to-be-inspected base station; and determine the second to-be-inspected base stations based on the identification information.

Optionally, the determining module 12 is configured to:

send a third notification message to the P second to-be-inspected base stations and a fourth notification message to neighboring stations of the second to-be-inspected base stations in turn, where after receiving second response messages sent by neighboring stations of an second to-be-inspected base station, the control network element sends the third notification message to an (i+1)' second to-be-inspected base station, and sends the fourth notification message to neighboring stations of the (i+1)$^{th}$ second to-be-inspected base station, where the third notification message is used to instruct the second to-be-inspected base station to stay silent in a preset radio frame, the fourth notification message is used to instruct the neighboring station to detect interference when the second to-be-inspected base station is silent, and the second response message is used to indicate whether interference received by the neighboring station of the second to-be-inspected base station that is detected by the neighboring base station has changed when the second to-be-inspected base station is silent; and determine the out-of-synchronization base station based on the second response messages.

Optionally, the determining module 12 is further configured to, if determining, based on the second response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

Optionally, the determining module 12 is configured to:

send a second detection message to the P second to-be-inspected base stations in turn, where after receiving a second feedback message sent by an $i^{th}$ second to-be-inspected base station, the determining module sends the second detection message to an $(i+1)^{th}$ second to-be-inspected base station, where the second detection message is used to instruct the second to-be-inspected base station to stay silent in a preset radio frame, and the second feedback message includes identification information of an out-of-synchronization base station determined by the second to-be-inspected base station; and determine the out-of-synchronization base station based on the identification information.

Optionally, the determining module 12 is configured to:

if N is less than a preset threshold, determine all the N base stations as the first to-be-inspected base stations.

Optionally, the determining module 12 is configured to:

if N is greater than or equal to a preset threshold, determine whether the first interference and noise, the second interference and noise, and the third interference and noise of the N base stations are all greater than a preset gate; and if the first interference and noise, the second interference and noise, and the third interference and noise of the N base stations are all greater than the preset gate, determine, in descending order of average values of the first interference and noise, the second interference and noise, and the third interference and noise, first M base stations as the first to-be-inspected base stations.

Optionally, the determining module 12 is configured to:

if N is greater than or equal to a preset threshold, and the first interference and noise of the N base stations is less than the preset gate, determine a quantity of neighbor relationships between each neighboring station of the base stations and the N base stations; and determine, in descending order of neighbor relationship quantities, first M neighboring stations as the first to-be-inspected base stations, where the neighbor relationships include neighbor relationships between neighboring stations of the base stations and the N base stations.

Optionally, the determining module 12 is configured to:

if N is greater than or equal to a preset threshold, determine, in descending order of average values of the first interference and noise, the second interference and noise, and the third interference and noise, first L base stations as the first to-be-inspected base stations, and determine, in descending order of neighbor relationship quantities, first P base stations as the first to-be-inspected base stations, where the neighbor relationships include neighbor relationships between neighboring stations of the base stations and the N base stations, L and P are integers, and a sum of L and P is equal to M.

The out-of-synchronization determining apparatus provided in this embodiment of this application may perform the foregoing method embodiment. An implementation principle and a technical effect of the out-of-synchronization determining apparatus are similar to those of the method embodiment. No more details are described herein.

Figure 13:
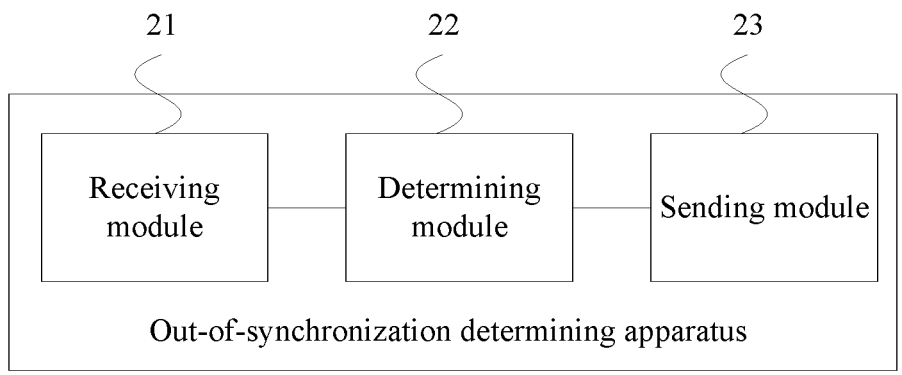
FIG. 13 is a schematic structural diagram of Embodiment 2 of an out-of-synchronization determining apparatus according to embodiments of this application.

FIG. 13 is a schematic structural diagram of Embodiment 2 of an out-of-synchronization determining apparatus according to the embodiments of this application. The determining apparatus may be a standalone base station, or may be an apparatus integrated in a base station. The apparatus may be implemented by software, hardware, or a combination of software and hardware. As shown in FIG. 13, the determining apparatus includes:

a receiving module 21, configured to receive a detection message sent by a control network element;

a determining module 22, configured to determine, in response to the detection message, a second to-be-inspected base station, where the second to-be-inspected base station is a base station meeting a detection condition, and the detection condition is that a characteristic sequence broadcast by the out-of-synchronization determining apparatus at a specified position in a radio frame is not received by any neighboring station at the specified position; and a sending module 23, configured to send a feedback message to the control network element, where the feedback message includes identification information of the second to-be-inspected base station.

Optionally, the receiving module 21 may be a receiver in a base station or may integrate some processor functions. Correspondingly, the determining module 22 may be a processor in the base station, and the sending module 23 may be a transmitter in the base station or may integrate some processor functions.

The out-of-synchronization determining apparatus provided in this embodiment of this application may perform the foregoing method embodiment. An implementation principle and a technical effect of the out-of-synchronization determining apparatus are similar to those of the method embodiment. No more details are described herein.

Optionally, the determining module 22 is configured to:

send, in response to the detection message, a notification message to all the neighboring stations, where the notification message is used to instruct the neighboring station to receive the characteristic sequence at the preset position in the radio frame;

send the characteristic sequence at the preset position in the radio frame; and receive a response message sent by each of the neighboring stations, and determine the second to-be-inspected base station based on the response messages, where the response message is used to indicate whether the neighboring station has received the characteristic sequence.

Optionally, the determining module 22 is configured to:

if determining, based on the response messages, that none of the neighboring stations has received the characteristic sequence, determine the out-of-synchronization determining apparatus as the second to-be-inspected base station.

The out-of-synchronization determining apparatus provided in this embodiment of this application may perform the foregoing method embodiment. An implementation principle and a technical effect of the out-of-synchronization determining apparatus are similar to those of the method embodiment. No more details are described herein.

Figure 14:
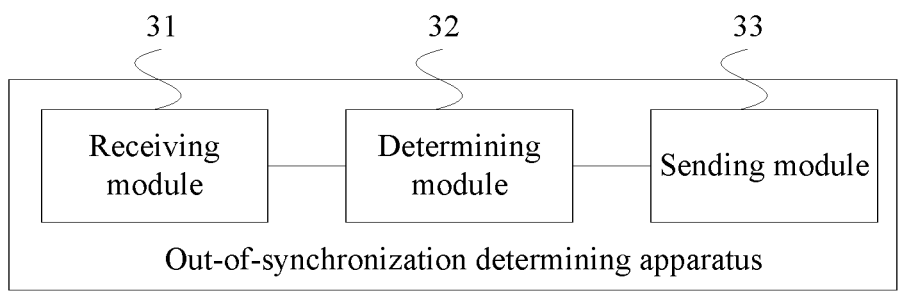
FIG. 14 is a schematic structural diagram of Embodiment 3 of an out-of-synchronization determining apparatus according to embodiments of this application.

FIG. 14 is a schematic structural diagram of Embodiment 3 of an out-of-synchronization determining apparatus according to the embodiments of this application. The determining apparatus may be a standalone base station, or may be an apparatus integrated in a base station. The apparatus may be implemented by software, hardware, or a combination of software and hardware. As shown in FIG. 14, the determining apparatus includes:

a receiving module 31, configured to receive a detection message sent by a control network element;

a determining module 32, configured to determine an out-of-synchronization base station in response to the detection message, where the out-of-synchronization base station is a base station meeting a detection condition, and the detection condition is that interference detected by neighboring stations of the second to-be-inspected base station has changed when the second to-be-inspected base station is silent; and a sending module 33, configured to send a feedback message to the control network element, where the feedback message includes identification information of the out-of-synchronization base station.

Optionally, the receiving module 31 may be a receiver in a base station or may integrate some processor functions. Correspondingly, the determining module 32 may be a processor in the base station, and the sending module 33 may be a transmitter in the base station or may integrate some processor functions.

The out-of-synchronization determining apparatus provided in this embodiment of this application may perform the foregoing method embodiment. An implementation principle and a technical effect of the out-of-synchronization determining apparatus are similar to those of the method embodiment. No more details are described herein.

Optionally, the determining module 32 is configured to:
send a notification message to all the neighboring stations, where the notification message is used to instruct the neighboring station to detect interference received by the neighboring station when the second to-be-inspected base station is silent;
set the second to-be-inspected base station to be silent in a preset radio frame; and
receive a response message sent by each of the neighboring stations, and determine the out-of-synchronization base station based on the response messages, where the response message is used to indicate whether the interference detected by the neighboring station of the second to-be-inspected base station has changed when the second to-be-inspected base station is silent.

Optionally, the determining module 32 is configured to:
if determining, based on the response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

The out-of-synchronization determining apparatus provided in this embodiment of this application may perform the foregoing method embodiment. An implementation principle and a technical effect of the out-of-synchronization determining apparatus are similar to those of the method embodiment. No more details are described herein.

Figure 15:
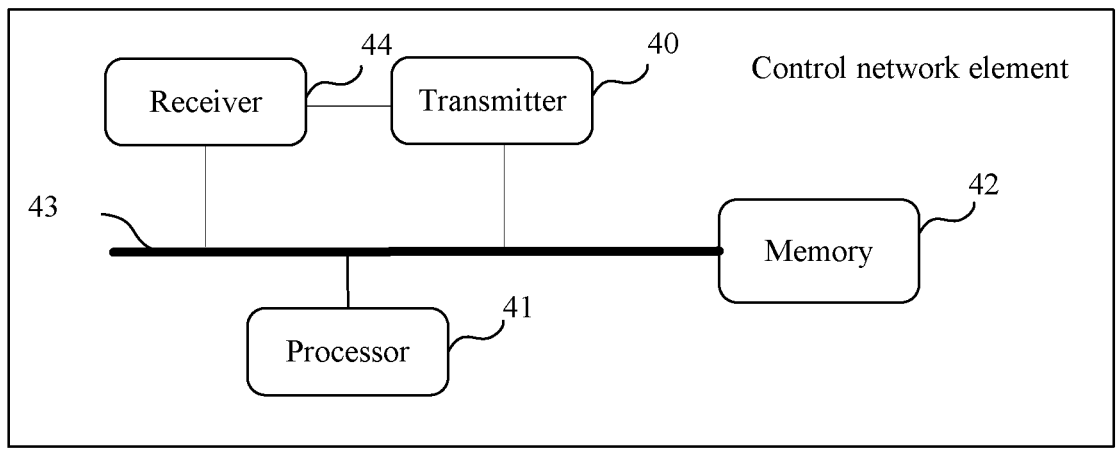
FIG. 15 is a schematic structural diagram of an embodiment of a control network element according to embodiments of this application.

FIG. 15 is a schematic structural diagram of an embodiment of a control network element according to the embodiments of this application. As shown in FIG. 15, the control network element may include a transmitter 40, a processor 41, a memory 42, and at least one communications bus 43. The communications bus 43 is configured to implement communication connectivity between components. The memory 42 may include a high-speed RAM memory, or may further include a non-volatile memory NVM, for example, at least one disk memory. The memory 42 may store various programs, to complete various processing functions and implement method steps in this embodiment. The control network element may further include a receiver 44. The receiver 44 in this embodiment may be a corresponding input interface having a communication function and an information receiving function, or may be a radio frequency module or a baseband module in the control network element. The transmitter 40 in this embodiment may be a corresponding output interface having a communication function and an information sending function, or may be a radio frequency module or a baseband module in the control network element. Optionally, the transmitter 40 and the receiver 44 may be integrated into one communications interface, or may be two separate communications interfaces.

In this embodiment, the receiver 44 is configured to receive interference metrics sent by N base stations, where the interference metrics include first interference and noise, second interference and noise, and third interference and noise, and the first interference and noise, the second interference and noise, and the third interference and noise are interference received in different uplink subframe symbols; and the processor 41 is configured to determine, based on the interference metrics, M first to-be-inspected base stations in the N base stations and/or neighboring stations of the N base stations; where the processor 41 is further configured to determine P second to-be-inspected base stations, where the P second to-be-inspected base stations are base stations meeting a detection condition that are selected from the M first to-be-inspected base stations, and the detection condition is that a characteristic sequence broadcast by the first to-be-inspected base station at a specified position in a radio frame is not received by any neighboring station at the specified position; and the processor 41 is further configured to determine an out-of-synchronization base station in the P second to-be-inspected base stations; where N and M are positive integers, P is an integer, and P is less than or equal to M.

Optionally, the transmitter 40 is configured to send a first notification message to each of the M first to-be-inspected base stations, where the first notification message is used to instruct the first to-be-inspected base station to broadcast the characteristic sequence at the preset position in a radio frame;

the transmitter 40 is further configured to send a second notification message to neighboring stations of the first to-be-inspected base stations, where the second notification message is used to instruct the neighboring station of the first to-be-inspected base station to receive the characteristic sequence at the preset position in a radio frame;

the receiver 44 is further configured to receive a first response message sent by each neighboring station of the first to-be-inspected base stations, where the first response message is used to indicate whether the neighboring station of the first to-be-inspected base station has received the characteristic sequence; and the processor 41 is further configured to, if determining, based on the first response messages, that no neighboring station of the first to-be-inspected base station has received the characteristic sequence, determine the first to-be-inspected base station as the second to-be-inspected base station.

Optionally, the transmitter 40 is further configured to send a first detection message to each of the M first to-be-inspected base stations, where the first detection message is used to instruct the first to-be-inspected base station to send the characteristic sequence at the preset position in a radio frame;

the receiver 44 is further configured to receive a first feedback message sent by each of the M first to-be-inspected base stations, where the first feedback message includes identification information of each second to-be-inspected base station determined by the first to-be-inspected base station; and the processor 41 is further configured to determine the second to-be-inspected base stations based on the identification information.

Optionally, the transmitter 40 is further configured to send a third notification message to the P second to-be-inspected base stations and a fourth notification message to neighboring stations of the second to-be-inspected base stations in turn, where after receiving second response messages sent by neighboring stations of an $i^{th}$ second to-be-inspected base station, the control network element sends the third notification message to an $(i+1)^{th}$ second to-be-inspected base station, and sends the fourth notification message to neighboring stations of the $(i+1)^{th}$ second to-be-inspected base station, where the third notification message is used to instruct the second to-be-inspected base station to stay silent in a preset radio frame, the fourth notification message is used to instruct the neighboring station to detect interference when the second to-be-inspected base station is silent, and the second response message is used to indicate whether interference received by the neighboring station of the second to-be-inspected base station that is detected by the neighboring base station has changed when the second to-be-inspected base station is silent; and the processor 41 is further configured to determine the out-of-synchronization base station based on the second response messages.

Optionally, the processor 41 is configured to:

if determining, based on the second response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

Optionally, the transmitter 40 is configured to send a second detection message to the P second to-be-inspected base stations in turn, where after receiving a second feedback message sent by an $i^{th}$ second to-be-inspected base station, the control network element sends the second detection message to an $(i+1)^{th}$ second to-be-inspected base station, where the second detection message is used to instruct the second to-be-inspected base station to stay silent in a preset radio frame, and the second feedback message includes identification information of an out-of-synchronization base station determined by the second to-be-inspected base station; and the processor 41 is further configured to determine the out-of-synchronization base station based on the identification information.

Optionally, the processor 41 is configured to:

if N is less than a preset threshold, determine all the N base stations as the first to-be-inspected base stations.

Optionally, the processor 41 is configured to:

if N is greater than or equal to a preset threshold, determine whether the first interference and noise, the second interference and noise, and the third interference and noise of the N base stations are all greater than a preset gate; and if the first interference and noise, the second interference and noise, and the third interference and noise of the N base stations are all greater than the preset gate, determine, in descending order of average values of the first interference and noise, the second interference and noise, and the third interference and noise, first M base stations as the first to-be-inspected base stations.

Optionally, the processor 41 is configured to:

if N is greater than or equal to a preset threshold, and the first interference and noise of the N base stations is less than a preset gate, determine a quantity of neighbor relationships between each neighboring station of the base stations and the N base stations; and determine, in descending order of neighbor relationship quantities, first M neighboring stations as the first to-be-inspected base stations, where the neighbor relationships include neighbor relationships between neighboring stations of the base stations and the N base stations.

Optionally, the processor 41 is configured to:

if N is greater than or equal to a preset threshold, determine, in descending order of average values of the first interference and noise, the second interference and noise, and the third interference and noise, first L base stations as the first to-be-inspected base stations, and determine, in descending order of neighbor relationship quantities, first P base stations as the first to-be-inspected base stations, where the neighbor relationships include neighbor relationships between neighboring stations of the base stations and the N base stations, L and P are integers, and a sum of L and P is equal to M.

The control network element provided in this embodiment of this application may perform the foregoing method embodiment. An implementation principle and a technical effect of the control network element are similar to those of the method embodiment. No more details are described herein.

Figure 16:
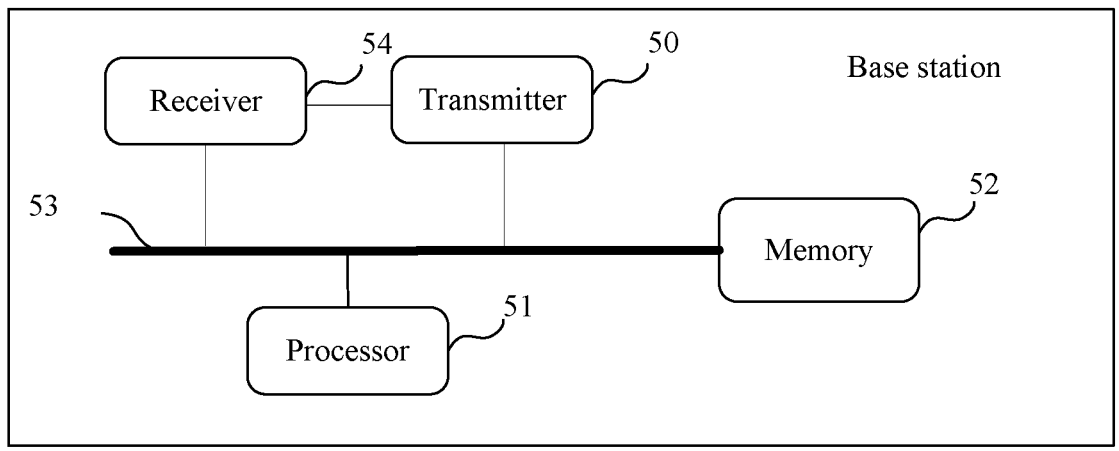
FIG. 16 is a schematic structural diagram of Embodiment 1 of a base station according to embodiments of this application.

FIG. 16 is a schematic structural diagram of Embodiment 1 of a base station according to the embodiments of this application. As shown in FIG. 16, the base station may include a transmitter 50, a processor 51, a memory 52, and at least one communications bus 53. The communications bus 53 is configured to implement communication connectivity between components. The memory 52 may include a high-speed RAM memory, or may further include a non-volatile memory NVM, for example, at least one disk memory. The memory 52 may store various programs, to complete various processing functions and implement method steps in this embodiment. The base station may further include a receiver 54. The receiver 54 in this embodiment may be a corresponding input interface having a communication function and an information receiving function, or may be a radio frequency module or a baseband module in the base station. The base station may further include the transmitter 50. The transmitter 50 in this embodiment may be a corresponding output interface having a communication function and an information sending function, or may be a radio frequency module or a baseband module in the base station. Optionally, the transmitter 50 and the receiver 54 may be integrated into one communications interface, or may be two separate communications interfaces.

In this embodiment, the receiver 54 is configured to receive a detection message sent by a control network element;

the processor 51 is configured to determine, in response to the detection message, a second to-be-inspected base station, where the second to-be-inspected base station is a base station meeting a detection condition, and the detection condition is that a characteristic sequence broadcast by a first to-be-inspected base station at a specified position in a radio frame is not received by any neighboring station at the specified position; and the transmitter 50 is configured to send a feedback message to the control network element, where the feedback message includes identification information of the second to-be-inspected base station.

Optionally, the transmitter 50 is further configured to send, in response to the detection message, a notification message to all the neighboring stations, where the notification message is used to instruct the neighboring station to receive the characteristic sequence at the preset position in the radio frame;

the transmitter 50 is further configured to send the characteristic sequence at the preset position in the radio frame; and the receiver 54 is further configured to receive a response message sent by each of the neighboring stations, and determine the second to-be-inspected base station based on the response messages, where the response message is used to indicate whether the neighboring station has received the characteristic sequence.

Optionally, the processor 51 is configured to:

if determining, based on the response messages, that none of the neighboring stations has received the characteristic sequence, determine the first to-be-inspected base station as the second to-be-inspected base station.

The base station provided in this embodiment of this application may perform the foregoing method embodiment. An implementation principle and a technical effect of the base station are similar to those of the method embodiment. No more details are described herein.

Figure 17:
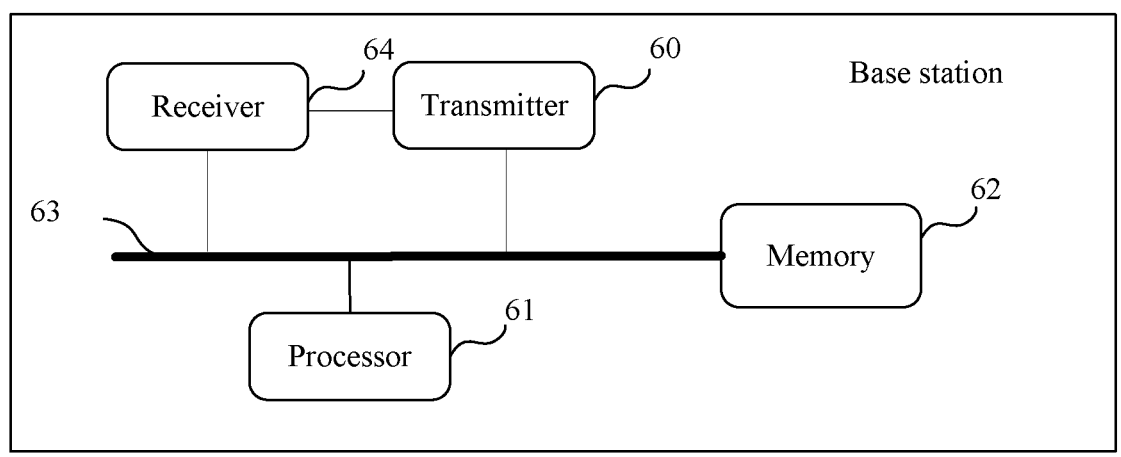
FIG. 17 is a schematic structural diagram of Embodiment 2 of a base station according to embodiments of this application.

FIG. 17 is a schematic structural diagram of Embodiment 2 of a base station according to the embodiments of this application. As shown in FIG. 17, the base station may include a transmitter 60, a processor 61, a memory 62, and at least one communications bus 63. The communications bus 63 is configured to implement communication connectivity between components. The memory 62 may include a high-speed RAM memory, or may further include a non-volatile memory NVM, for example, at least one disk memory. The memory 62 may store various programs, to complete various processing functions and implement method steps in this embodiment. The base station may further include a receiver 64. The receiver 64 in this embodiment may be a corresponding input interface having a communication function and an information receiving function, or may be a radio frequency module or a baseband module in the base station. The base station may further include the transmitter 60. The transmitter 60 in this embodiment may be a corresponding output interface having a communication function and an information sending function, or may be a radio frequency module or a baseband module in the base station. Optionally, the transmitter 60 and the receiver 64 may be integrated into one communications interface, or may be two separate communications interfaces.

In this embodiment, the receiver 64 is configured to receive a detection message sent by a control network element;

the processor 61 is configured to determine an out-of-synchronization base station in response to the detection message, where the out-of-synchronization base station is a base station meeting a detection condition, and the detection condition is that interference detected by neighboring stations of the second to-be-inspected base station has changed when the second to-be-inspected base station is silent; and the transmitter 60 is configured to send a feedback message to the control network element, where the feedback message includes identification information of the out-of-synchronization base station.

Optionally, the transmitter 60 is configured to send a notification message to all the neighboring stations, where the notification message is used to instruct the neighboring station to detect interference received by the neighboring station when the second to-be-inspected base station is silent;

the processor 61 is configured to set the second to-be-inspected base station to be silent in a preset radio frame; and the receiver 64 is configured to receive a response message sent by each of the neighboring stations, and determine the out-of-synchronization base station based on the response messages, where the response message is used to indicate whether the interference detected by the neighboring station of the second to-be-inspected base station has changed when the second to-be-inspected base station is silent.

Optionally, the processor 61 is configured to:

if determining, based on the response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

The base station provided in this embodiment of this application may perform the foregoing method embodiment. An implementation principle and a technical effect of the base station are similar to those of the method embodiment. No more details are described herein.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, through a coaxial cable, an optical fiber, or a digital subscriber line (DSL)) or wireless (for example, through infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. An out-of-synchronization determining method, comprising:
    receiving, by a control network element, interference metrics sent by N base stations, wherein the interference metrics comprise first interference and noise, second interference and noise, and third interference and noise, and the first interference and noise, the second interference and noise, and the third interference and noise are interference received in different uplink subframe symbols;
    determining based on the interference metrics, by the control network element, M first to-be-inspected base stations in the N base stations and/or neighboring stations of the N base stations;
    determining, by the control network element, P second to-be-inspected base stations, wherein the P second to-be-inspected base stations meet a detection condition that are selected from the M first to-be-inspected base stations, wherein the detection condition is that a characteristic sequence broadcast by the first to-be-inspected base station at a specified position in a radio frame is not received by any neighboring station at the specified position; and
    determining, by the control network element, an out-of-synchronization base station in the P second to-be-inspected base stations; wherein
    N and M are positive integers, P is an integer, and P is less than or equal to M.

2. The method according to claim 1, wherein the determining, by the control network element, P second to-be-inspected base stations comprises:
    sending, by the control network element, a first notification message to each of the M first to-be-inspected base stations, wherein the first notification message instructs the first to-be-inspected base station to broadcast the characteristic sequence at the preset position in a radio frame;
    sending, by the control network element, a second notification message to neighboring stations of the first to-be-inspected base stations, wherein the second notification message instructs the neighboring station of the first to-be-inspected base station to receive the characteristic sequence at the preset position in a radio frame;
    receiving, by the control network element, a first response message sent by each neighboring station of the first to-be-inspected base stations, wherein the first response message indicates whether the neighboring station of the first to-be-inspected base station has received the characteristic sequence; and
    when determining, based on the first response messages, that no neighboring station of the first to-be-inspected base station has received the characteristic sequence, determining, by the control network element, the first to-be-inspected base station as the second to-be-inspected base station.

3. The method according to claim 1, wherein the determining, by the control network element, P second to-be-inspected base stations comprises:
    sending, by the control network element, a first detection message to each of the M first to-be-inspected base stations, wherein the first detection message instructs the first to-be-inspected base station to send the characteristic sequence at the preset position in a radio frame;
    receiving, by the control network element, a first feedback message sent by each of the M first to-be-inspected base stations, wherein the first feedback message comprises identification information of each second to-be-inspected base station determined by the first to-be-inspected base station; and
    determining, by the control network element based on the identification information, the second to-be-inspected base stations.

4. The method according to claim 1, wherein the determining, by the control network element, an out-of-synchronization base station in the P second to-be-inspected base stations comprises:
    sending, by the control network element, a third notification message to the P second to-be-inspected base stations and a fourth notification message to neighboring stations of the second to-be-inspected base stations, wherein after receiving second response messages sent by neighboring stations of an $i^{th}$ second to-be-inspected base station, the control network element sends the third notification message to an $(i+1)^{th}$ second to-be-inspected base station, and sends the fourth notification message to neighboring stations of the $(i+1)^{th}$ second to-be-inspected base station, wherein the third notification message instructs the second to-be-inspected base station to stay silent in a preset radio frame, the fourth notification message instructs the neighboring station to detect interference when the second to-be-inspected base station is silent, and the second response message indicates whether interference received by the neighboring station of the second to-be-inspected base station that is detected by the neighboring base station has changed when the second to-be-inspected base station is silent; and
    determining, by the control network element, the out-of-synchronization base station based on the second response messages.

5. The method according to claim 4, wherein the determining, by the control network element, the out-of-synchronization base station based on the second response messages comprises:
    when the control network element determines, based on the second response messages, that the interference detected by the neighboring stations of the second to-be-inspected base station in the preset radio frame has changed when the second to-be-inspected base station is silent in the preset radio frame, determining, by the control network element, the second to-be-inspected base station as the out-of-synchronization base station.

6. The method according to claim 1, wherein the determining, by the control network element, an out-of-synchronization base station in the P second to-be-inspected base stations comprises:
    sending, by the control network element, a second detection message to the P second to-be-inspected base stations, wherein after receiving a second feedback message sent by an $i^{th}$ second to-be-inspected base station, the control network element sends the second detection message to an $(i+1)^{th}$ second to-be-inspected base station, wherein the second detection message instructs the second to-be-inspected base station to stay silent in a preset radio frame, and the second feedback message comprises identification information of an out-of-synchronization base station determined by the second to-be-inspected base station; and
    determining, by the control network element, the out-of-synchronization base station based on the identification information.

7. The method according to claim 1, wherein the determining, by the control network element based on the interference metrics, M first to-be-inspected base stations in the N base stations comprises:
when N is less than a preset threshold, determining, by the control network element, all the N base stations as the first to-be-inspected base stations.

8. The method according to claim 1, wherein the determining, by the control network element based on the interference metrics, M first to-be-inspected base stations in the N base stations comprises:
when N is greater than or equal to a preset threshold, determining, by the control network element, whether the first interference and noise, the second interference and noise, and the third interference and noise of the N base stations are all greater than a preset gate; and
when the first interference and noise, the second interference and noise, and the third interference and noise of the N base stations are all greater than the preset gate, determining, by the control network element in descending order of average values of the first interference and noise, the second interference and noise, and the third interference and noise, first M base stations as the first to-be-inspected base stations.

9. The method according to claim 1, wherein the determining, by the control network element based on the interference metrics, M first to-be-inspected base stations in neighboring stations of the N base stations comprises:
when N is greater than or equal to a preset threshold, and the first interference and noise of the N base stations is less than a preset gate, determining, by the control network element, a quantity of neighbor relationships between each neighboring station of the base stations and the N base stations; and
determining, by the control network element in descending order of neighbor relationship quantities, first M neighboring stations as the first to-be-inspected base stations, wherein the neighbor relationships comprise neighbor relationships between neighboring stations of the base stations and the N base stations.

10. The method according to claim 1, wherein the determining, by the control network element based on the interference metrics, M first to-be-inspected base stations in the N base stations and neighboring stations of the N base stations comprises:
when N is greater than or equal to a preset threshold, determining, by the control network element in descending order of average values of the first interference and noise, the second interference and noise, and the third interference and noise, first L base stations as the first to-be-inspected base stations, and determining, in descending order of neighbor relationship quantities, first P base stations as the first to-be-inspected base stations, wherein the neighbor relationships comprise neighbor relationships between neighboring stations of the base stations and the N base stations, L and P are integers, and a sum of L and P is equal to M.

11. An out-of-synchronization determining method, comprising:
receiving, by a first to-be-inspected base station, a detection message sent by a control network element;
determining, by the first to-be-inspected base station in response to the detection message, a second to-be-inspected base station meeting a detection condition, wherein the detection condition is that a characteristic sequence broadcast by the first to-be-inspected base station at a specified position in a radio frame is not received by any neighboring station at the specified position; and
sending, by the first to-be-inspected base station, a feedback message to the control network element, wherein the feedback message comprises identification information of the second to-be-inspected base station.

12. The method according to claim 11, wherein the determining, by the first to-be-inspected base station in response to the detection message, a second to-be-inspected base station comprises:
sending, by the first to-be-inspected base station in response to the detection message, a notification message to all the neighboring stations, wherein the notification message instructs the neighboring station to receive the characteristic sequence at the preset position in the radio frame;
sending, by the first to-be-inspected base station, the characteristic sequence at the preset position in the radio frame; and
receiving, by the first to-be-inspected base station, a response message sent by each of the neighboring stations, and determining the second to-be-inspected base station based on the response messages, wherein the response message indicates whether the neighboring station has received the characteristic sequence.

13. The method according to claim 12, wherein the determining the second to-be-inspected base station based on the response messages comprises:
when determining, based on the response messages, that none of the neighboring stations has received the characteristic sequence, determining, by the first to-be-inspected base station, the first to-be-inspected base station as the second to-be-inspected base station.

14. An out-of-synchronization determining apparatus, comprising:
a processor; and
a memory coupled to the processor and having processor-executable instructions stored thereon, which when executed by the processor, cause the apparatus to:
receive interference metrics sent by N base stations, wherein the interference metrics comprise first interference and noise, second interference and noise, and third interference and noise, and the first interference and noise, the second interference and noise, and the third interference and noise are interference received in different uplink subframe symbols; and
determine, based on the interference metrics, M first to-be-inspected base stations in the N base stations and/or neighboring stations of the N base stations;
determine P second to-be-inspected base stations, wherein the P second to-be-inspected base stations meet a detection condition that are selected from the M first to-be-inspected base stations, and the detection condition is that a characteristic sequence broadcast by the first to-be-inspected base station at a specified position in a radio frame is not received by any neighboring station at the specified position; and
determine an out-of-synchronization base station in the P second to-be-inspected base stations; wherein
N and M are positive integers, P is an integer, and P is less than or equal to M.

15. The apparatus according to claim 14, wherein the processor-executable instructions cause the apparatus to:
send a first notification message to each of the M first to-be-inspected base stations, wherein the first notification message instructs the first to-be-inspected base station to broadcast the characteristic sequence at the preset position in a radio frame;

send a second notification message to neighboring stations of the first to-be-inspected base stations, wherein the second notification message instructs the neighboring station of the first to-be-inspected base station to receive the characteristic sequence at the preset position in a radio frame;

receive a first response message sent by each neighboring station of the first to-be-inspected base stations, wherein the first response message indicates whether the neighboring station of the first to-be-inspected base station has received the characteristic sequence; and when determining, based on the first response messages, that no neighboring station of the first to-be-inspected base station has received the characteristic sequence, determine the first to-be-inspected base station as the second to-be-inspected base station.

16. The apparatus according to claim 14, wherein the processor-executable instructions cause the apparatus to:

send a first detection message to each of the M first to-be-inspected base stations, wherein the first detection message instructs the first to-be-inspected base station to send the characteristic sequence at the preset position in a radio frame;

receive a first feedback message sent by each of the M first to-be-inspected base stations, wherein the first feedback message comprises identification information of each second to-be-inspected base station determined by the first to-be-inspected base station; and determine the second to-be-inspected base stations based on the identification information.

17. The apparatus according to claim 14, wherein the processor-executable instructions cause the apparatus to:

send, a third notification message to the P second to-be-inspected base stations and a fourth notification message to neighboring stations of the second to-be-inspected base stations, wherein after receiving second response messages sent by neighboring stations of an $i^{th}$ second to-be-inspected base station, the determining module sends the third notification message to an $(i+1)^{th}$ second to-be-inspected base station, and sends the fourth notification message to neighboring stations of the $(i+1)^{th}$ second to-be-inspected base station, wherein the third notification message instructs the second to-be-inspected base station to stay silent in a preset radio frame, the fourth notification message instructs the neighboring station to detect interference when the second to-be-inspected base station is silent, and the second response message indicates whether interference received by the neighboring station of the second to-be-inspected base station that is detected by the neighboring base station has changed when the second to-be-inspected base station is silent; and determine the out-of-synchronization base station based on the second response messages.

18. The apparatus according to claim 17, wherein the processor-executable instructions cause the apparatus to, when determining, based on the second response messages, that the interference detected by the neighboring stations of the second to-be-inspected base station in the preset radio frame has changed when the second to-be-inspected base station is silent in the preset radio frame, determine the second to-be-inspected base station as the out-of-synchronization base station.

19. The apparatus according to claim 14, wherein the processor-executable instructions cause the apparatus to:

send a second detection message to the P second to-be-inspected base stations, wherein after receiving a second feedback message sent by an $i^{th}$ second to-be-inspected base station, the determining module sends the second detection message to an $(i+1)^{th}$ second to-be-inspected base station, wherein the second detection message instructs the second to-be-inspected base station to stay silent in a preset radio frame, and the second feedback message comprises identification information of an out-of-synchronization base station determined by the second to-be-inspected base station; and determine the out-of-synchronization base station based on the identification information.

20. The apparatus according to claim 14, wherein the processor-executable instructions cause the apparatus to:

when N is less than a preset threshold, determine all the N base stations as the first to-be-inspected base stations.

* * * * *